United States Patent
Vu et al.

(10) Patent No.: US 9,360,573 B2
(45) Date of Patent: Jun. 7, 2016

(54) SYSTEM AND METHOD FOR GENERATING 3D IMAGES OF NON-LINEAR PROPERTIES OF ROCK FORMATION USING SURFACE SEISMIC OR SURFACE TO BOREHOLE SEISMIC OR BOTH

(71) Applicants: Chevron U.S.A., Inc., San Ramon, CA (US); LOS ALAMOS NATIONAL SECURITY LLC, Los Alamos, NM (US)

(72) Inventors: Cung Khac Vu, Houston, TX (US); Kurt Toshimi Nihei, Oakland, CA (US); Paul A. Johnson, Santa Fe, NM (US); Robert A. Guyer, Reno, NV (US); James A. Ten Cate, Los Alamos, NM (US); Pierre-Yves Le Bas, Los Alamos, NM (US); Carene S. Larmat, Los Alamos, NM (US)

(73) Assignees: LOS ALAMOS NATIONAL SECURITY LLC, Los Alamos, NM (US); CHEVRON U.S.A. INC., San Ramon, CA (US)

( * ) Notice: Subject to any disclaimer, the term of this patent is extended or adjusted under 35 U.S.C. 154(b) by 314 days.

(21) Appl. No.: 14/092,051

(22) Filed: Nov. 27, 2013

(65) Prior Publication Data
US 2014/0160882 A1 Jun. 12, 2014

Related U.S. Application Data

(60) Provisional application No. 61/730,417, filed on Nov. 27, 2012.

(51) Int. Cl.
*G01V 1/34* (2006.01)
*G01V 1/00* (2006.01)

(52) U.S. Cl.
CPC ............ *G01V 1/006* (2013.01); *G01V 2210/12* (2013.01); *G01V 2210/125* (2013.01); *G01V 2210/127* (2013.01); *G01V 2210/16* (2013.01); *G01V 2210/588* (2013.01)

(58) Field of Classification Search
CPC . G01V 1/345; G01V 1/006; G01V 2210/127; G01V 2210/125; G01V 2210/588; G01V 2210/12; G01V 2210/16
USPC ......................................................... 367/7, 38
See application file for complete search history.

(56) References Cited

U.S. PATENT DOCUMENTS

| 2,153,920 A | 4/1939 | Gardner |
| 3,529,282 A | 9/1970 | Brown et al. |

(Continued)

FOREIGN PATENT DOCUMENTS

| CH | WO 2010085493 A1 * | 7/2010 | ............. G01V 1/282 |
| GB | 1324863 A * | 7/1973 | ............. G01V 1/003 |

OTHER PUBLICATIONS

Written Opinion of the International Preliminary Examining Authority dated Nov. 26, 2014 for PCT/US2013/072277.

(Continued)

*Primary Examiner* — Daniel L Murphy
(74) *Attorney, Agent, or Firm* — Pillsbury Winthrop Shaw Pittman, LLP

(57) ABSTRACT

A system and method of characterizing properties of a medium from a non-linear interaction are include generating, by first and second acoustic sources disposed on a surface of the medium on a first line, first and second acoustic waves. The first and second acoustic sources are controllable such that trajectories of the first and second acoustic waves intersect in a mixing zone within the medium. The method further includes receiving, by a receiver positioned in a plane containing the first and second acoustic sources, a third acoustic wave generated by a non-linear mixing process from the first and second acoustic waves in the mixing zone; and creating a first two-dimensional image of non-linear properties or a first ratio of compressional velocity and shear velocity, or both, of the medium in a first plane generally perpendicular to the surface and containing the first line, based on the received third acoustic wave.

44 Claims, 12 Drawing Sheets

(56) References Cited

U.S. PATENT DOCUMENTS

| | | | |
|---|---|---|---|
| 3,691,529 A * | 9/1972 | Pizante | G01V 1/306 367/47 |
| 4,316,267 A * | 2/1982 | Ostrander | G01V 1/306 367/59 |
| 5,521,882 A | 5/1996 | D'Angelo et al. | |
| 6,175,536 B1 | 1/2001 | Khan | |
| 7,301,852 B2 | 11/2007 | Leggett, III et al. | |
| 2002/0040188 A1 | 4/2002 | Averkiou | |
| 2002/0134612 A1 | 9/2002 | Khan | |
| 2010/0226207 A1 * | 9/2010 | Armstrong | G01V 1/42 367/57 |
| 2010/0265794 A1 | 10/2010 | Johnson et al. | |
| 2012/0120761 A1 | 5/2012 | Vu et al. | |

OTHER PUBLICATIONS

Ostrovsky et al., "Dynamic Nonlinear Elasticity in Geomaterials", Rivista del Nuovo Cimento, vol. 24, No. 7., 2001.

Jones et al., "Interaction of Elastic Waves in an Isotropic Solid", The Journal of the Acoustical Society of America, vol. 35, No. 1, Jan. 1963, pp. 5-10.

Korneev et al., "Nonlinear Interaction of Plane Elastic Waves", Lawrence Berkeley National Laboratory Report LBNL-41914, 1998.

International Preliminary Report on Patentability mailed Mar. 4, 2015 for corresponding International Patent Application No. PCT/US2013/072277 (45 pages).

Anderson, B., Guffa, M., Larmat, C., Ulrich, T., Johnson, P.A., Time Reversal, Acoustic Today (2008).

d'Angelo, R.M., Winkler, K.W. and Johnson, D.L., 2008, Three wave mixing test of hyperelasticity in highly nonlinear solids: sedimentary rocks. J. Acoust. Soc. Am., 123, 622-639.

Guyer, R. A., and P. A. Johnson, Nonlinear mesoscopic elasticity: evidence for a new class of materials, Physics Today, 52, 30-35, (1999).

Jones, G.L., and Kobett, D., 1963, Interaction of elastic waves in an isotropic solid. J. Acoust. Soc. Am., 35, 10-35.

Korneev, V.A., Nihei, K.T., and Myer, L.R., Nonlinear Interaction of Plane Elastic Waves, Lawrence Berkely National Laboratory, Earth Sciences Division, Jun. 1998. LBNL 414914.

Levin, S., Principle of Reverse Time Migration, Geophysics (1984).

International Search Report and Written Opinion dated Jul. 15, 2014 for PCT/US2013/072277.

\* cited by examiner

SYSTEM AND METHOD FOR GENERATING 3D IMAGES OF NON-LINEAR PROPERTIES OF ROCK FORMATION USING SURFACE SEISMIC OR SURFACE TO BOREHOLE SEISMIC OR BOTH

CROSS-REFERENCE TO RELATED APPLICATION

The present application claims priority from U.S. Provisional Application No. 61/730,417, filed on Nov. 27, 2012, the complete disclosure of which is incorporated herein by reference in its entirety for all purposes.

GOVERNMENT RIGHTS

This invention was made in part with Government support under Contract Number DE-AC52-06NA25396 awarded by the United States Department of Energy, and in part under Cooperative Research and Development Agreement (CRADA) No. LA05-C10518 with Los Alamos National Security, LLC. The Government may have certain rights in this invention.

FIELD

The present invention relates generally to acoustic interrogation of rock formations using surface seismic and more particularly to systems and methods for generating 2D and 3D images of non-linear properties of a rock formation using surface seismic or surface to borehole seismic or both. The term "surface seismic" is used herein to include seismic wave propagation from depths of approximately 10 meters to approximately one kilometer.

BACKGROUND

Non-linear behavior of acoustic waves in solid materials can be related to cracks or other damage in the solid materials and possibly to the state of stress and fluid-saturation. Non-linear behavior in rocks was explored and established by theory and experiments in the late 1980s. An overview is presented in Guyer and Johnson (Non-Linear Mesoscopic Elasticity, Wiley 1999) and Ostrovsky and Johnson (Rivista del Nouvo Cimento, Vol. 24, No. 7, 2001).

The general theory that governs non-linear interaction of acoustic wave in elastic media is well-known as described by Landau & Lifshitz in Theory of Elasticity, $3^{rd}$ edition, Pergamon Press, Oxford, 1986. There are specific kinematic properties called selection rules that govern non-linear, non-collinear, interactions between two acoustic beams or acoustic plane waves, as disclosed in Jones, G. L. & D. R. Korbett, Interaction of elastic waves in an isotropic solid, J. Acoust. Soc. Am., 35, 5-10 (1963). According to the selection rules, a third plane wave or beam wave resulting from a non-linear mixing of a first acoustic wave and a second acoustic wave is equal to the frequency difference between a frequency f1 of first plane wave and a frequency f2 of the second plane wave. In addition, according to the selection rules, the third plane wave can only be generated for a specific intersecting angle and frequency ratio of the first and second plane waves for any particular Poisson ratio of the medium at the intersecting zone of the first and second plane waves. More complete calculations of the interaction between two non-collinear acoustic plane waves are provided by Korneev, Nihei and Myer. (Non-linear Interaction of Plane Elastic Waves, Lawrence Berkley National Laboratory, Earth Science Division, June 1998, LBNL 414914).

A basic remote sensing system with non-linear acoustic probes generally consists of two acoustic sources located at two spaced apart positions and an array of acoustic detectors located at a different position from the acoustic sources. The two acoustic sources can generate first and second acoustic waves (e.g., first and second acoustic beam waves) that intersect at various locations in a medium to be investigated. A third acoustic wave (e.g., a third acoustic beam wave) can be generated by a non-linear interaction of the first and second acoustic waves with the medium. The third acoustic wave is then detected at the array of receivers.

Various systems designed for specific applications in a borehole environment have been described by D'Angelo et al. (U.S. Pat. No. 5,521,882), Leggett et al. (U.S. Pat. No. 7,301,852), Khan (U.S. Pat. No. 6,175,536), and Johnson et al. (U.S. Patent Application Publication No. US2010/0265794). These systems provide measurements of complex interference patterns originating from the non-linear interaction of the first and second acoustic waves with the medium.

SUMMARY

As aspect of the present invention is to provide a method of characterizing properties of a medium from a non-linear interaction. The method includes generating, by a first acoustic source disposed on a surface of the medium, a first acoustic wave; and generating, by a second acoustic source disposed on the surface of the medium spaced apart from the first acoustic source on a first line, a second acoustic wave, wherein the first acoustic source and the second acoustic source are controllable such that trajectories of the first and the second acoustic waves intersect in a mixing zone within the medium. The method further includes receiving, by a receiver positioned in a plane of the first acoustic source and the second acoustic source, a third acoustic wave generated by a non-linear mixing process from the first acoustic wave and the second acoustic wave in the mixing zone; and creating a first two-dimensional image of non-linear properties or a first ratio of compressional velocity and shear velocity, or both, of the medium in a first plane generally perpendicular to the surface and containing the first line, based on the received third acoustic wave.

In one embodiment, the method further includes moving the first acoustic source, the second acoustic source to a second line and creating a second two-dimensional image of the properties of the medium or a second ratio of compressional velocity and shear velocity of the medium, or both, in a second plane generally perpendicular to the surface and containing the second line, based on the received third acoustic wave. In one embodiment, the first two-dimensional image of the medium and the second two-dimensional image of the medium can then be combined to create a three-dimensional image of the medium.

Another aspect of the present invention is to provide a system of characterizing properties of a medium from a non-linear interaction. The system includes a first acoustic source disposed on a surface of the medium, the first acoustic source being configured to generate a first acoustic wave; and a second acoustic source disposed on the surface of the medium spaced apart from the first acoustic source on a first line, the second acoustic source being configured to generate a second acoustic wave, wherein the first acoustic source and the second acoustic source are controllable such that trajectories of the first and the second acoustic waves intersect in a mixing zone within the medium. The system further includes a receiver positioned in a plane containing the first acoustic source and the second acoustic source, the receiver being configured to receive a third acoustic wave generated by a non-linear mixing process from the first acoustic wave and the second acoustic wave in the mixing zone; and a processor configured to create a first two-dimensional image of non-linear properties or a first ratio of compressional velocity and shear velocity, or both, of the medium in a first plane generally perpendicular to the surface and containing the first line, based on the received third acoustic wave.

In one embodiment, the first acoustic source and the second acoustic source are moveable to a second line and the processor is further configured to create a second two-dimensional image of the properties of the medium or a second ratio of a compression velocity and shear velocity of the medium, or both, in a second plane generally perpendicular to the surface and containing the second line, based on the received third acoustic wave. In one embodiment, the first two-dimensional image of the medium and the second two-dimensional image of the medium can be combined by the processor to create a three-dimensional image of the medium.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
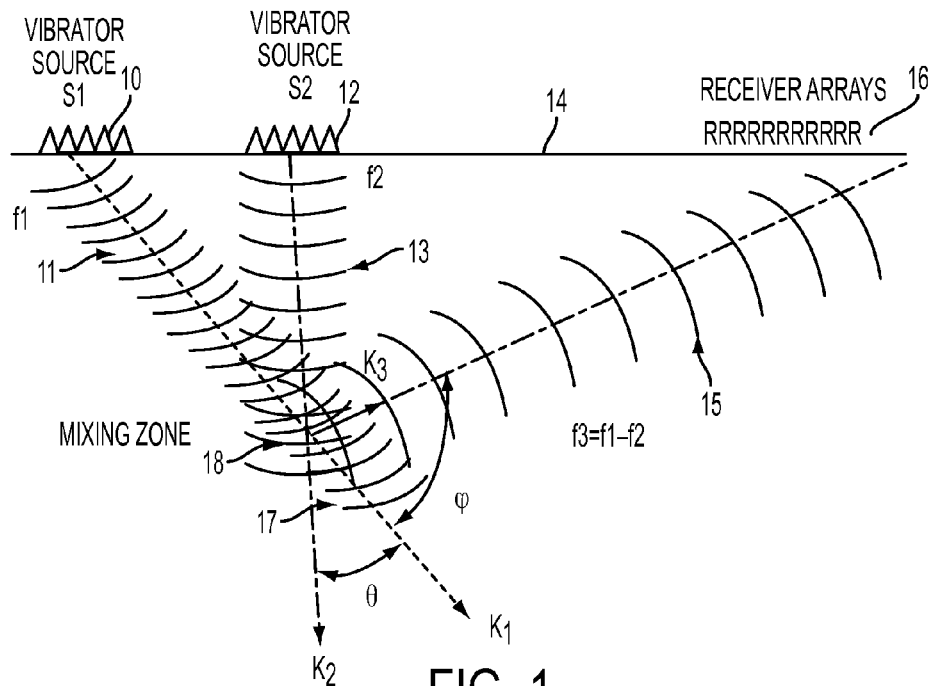
FIG. 1 is a cross-sectional view of the earth and depicts schematically a configuration for an earth surface seismic application, according to an embodiment of the present invention.

FIG. 1 is a cross-sectional view of the earth and depicts schematically a configuration for an earth surface seismic application, according to an embodiment of the present invention. In this embodiment, first and second acoustic sources (e.g., vibrator arrays) 10 and 12 are disposed, spaced apart from each other, on earth surface 14. The first acoustic source (S1) 10 is configured to generate a first acoustic wave 11 at a first frequency f1 and the second acoustic source (S2) 12 is configured to generate a second acoustic wave 13 at a second frequency f2 different from the first frequency f1. The term "acoustic wave" is used herein to include all types of elastic waves. The first acoustic source 10 and the second acoustic source 12 can include one or more acoustic wave generating elements (e.g., vibration elements). The one or more acoustic generating elements (e.g., array of acoustic elements) in acoustic source 10 can be configured to steer or direct the first acoustic wave 11 towards a desired direction. Similarly, the one or more acoustic generating elements (e.g., array of acoustic elements) in acoustic source 12 can also be configured to steer or direct the second acoustic wave 13 towards a desired direction. For example, the first acoustic wave 11 and the second acoustic wave 13 can be directed so that the first and second acoustic waves 11 and 13 intersect in a desired region or mixing zone 18 of a rock formation 17 beneath the earth surface 14. In other words, first acoustic source 10 and the second acoustic source 12 can be controlled such that trajectories of the first and the second acoustic waves 11 and 13 intersect in the mixing zone 18 within the rock formation 17. The acoustic source 10 and the acoustic source 12 can be configured to generate an acoustic beam or an acoustic cone. A receiver array (R) 16 is also disposed on earth surface 14 at a position spaced apart from the first acoustic source 10 and the second acoustic source 12. The receiver array 16 is positioned in a plane containing the first acoustic source 10 and the second acoustic source 12. In one embodiment, the receiver array 16 is located on a same line as the first acoustic source 10 and the second acoustic source 12. The receiver array 16 is configured to detect a third acoustic wave 15 return to the surface 14, the third acoustic wave 15 being generated by a non-linear interaction of the first acoustic wave 11 and the second acoustic wave 13 within the rock formation 17 at the mixing zone 18. The non-linear properties of the earth at the location between the two waves 11 and 13, i.e., at the mixing zone 18, result in the generation of the third wave 15. The strength of the third wave 15 is a function the non-linearity of the rocks in the mixing zone 18.

The third acoustic wave 15 has a frequency f3 equal to a difference between the first frequency f1 and the second frequency f2. For example, when a primary compressional (P) first wave with a frequency f1 and a primary compressional (P) second wave with a frequency f2 cross or intersect in a non-linear medium, a third shear (SV) wave can be generated with the frequency f3 equal to the difference between the first frequency f1 and the second frequency f2. This type of interaction can be written as (P+P→SV). Although, the P+P→SV interaction is discussed herein, as it can be appreciated other types of interactions can also be contemplated. The following discussion is equally applicable to P+SV→SV or any permutation of non-linear mixing of two elastic waves, compressional P wave or shear waves (SV and SH modes), to generate a third wave. Examples of other types of interactions, by n means a complete list of permutations, are provided in Table 1 below.

TABLE 1

| First Wave | Second Wave | Resultant third Wave from first + second waves |
|---|---|---|
| $P(f_1)$ | $SV(f_2)$ | $P(f_1 - f_2)$ |
| $P(f_1)$ | $SV(f_2)$ | $SV(f_1 - f_2)$ |
| $P(f_1)$ | $SH(f_2)$ | $SH(f_1 - f_2)$ |

In one embodiment, the acoustic sources 10 and 12 are a two-dimensional array acoustic sources that are configured so that a beam of seismic energy at, respectively, the first frequency f1 and the second frequency f2 can be directed downward at a specified injection angle (e.g., at a fixed azimuth angle equal zero). In one embodiment, the receiver array 16 can also be a two-dimensional array.

The selection rules for non-collinear non-linear mixing govern the relationship between the first frequency f1 of the first acoustic wave 11 and the second frequency f2 of the second acoustic wave 13. The selection rules also govern the intersection angle θ between a first wave vector k1 of the first acoustic wave 11 and a second wave vector k2 of the second acoustic wave 13 as well as the velocity ratio Vp/Vs between compressional velocity Vp and shear velocity Vs and the angle φ between a third wave vector k3 of the third acoustic wave 15 and the first wave vector k1 of the first acoustic wave 11.

In one embodiment, using trigonometric relationships between the acoustic wave vectors k3, k2 and k1, where k3 is equal to a difference between k1 and k2 (k3=k1−k2) and the selection rules, the following angular relationships can be determined. A detailed description of these relationships is provided in U.S. patent application Ser. No. 13/292,908 entitled "SYSTEM AND METHOD FOR INVESTIGATING SUB-SURFACE FEATURES OF A ROCK FORMATION USING COMPRESSIONAL ACOUSTIC SOURCES," the entire contents of which is herein incorporated by reference.

$$\sin(\theta/2) = \left(1 - \frac{f_2}{f_1}\right) \frac{\sqrt{(Vp/Vs)^2 - 1}}{2\sqrt{\frac{f_2}{f_1}}} \qquad (1)$$

$$\sin(\varphi) = (f_2/f_1) \times \sin(\theta)/(1 - f_2/f_1) \qquad (2)$$

By varying the beam direction angles (i.e., by varying the angle θ) and the ratio f2/f1 between the frequency f1 and the frequency f2, the mixing zone can be placed at all locations along a plane containing the first acoustic source 10, the second acoustic source 12 and receiver 16. From equations (1) and (2), the Vp/Vs ratio can be derived and mapped from returning signals detected in receivers 16. The amplitude of the received third wave is proportional to the non-linear properties of the earth at the mixing zone. This allows for the construction of the images of the earth describing the Vp/Vs ratio or the amplitude, or both, in the plane directly below the area of acoustic source 10 and the acoustic source 12.

Figure 2:
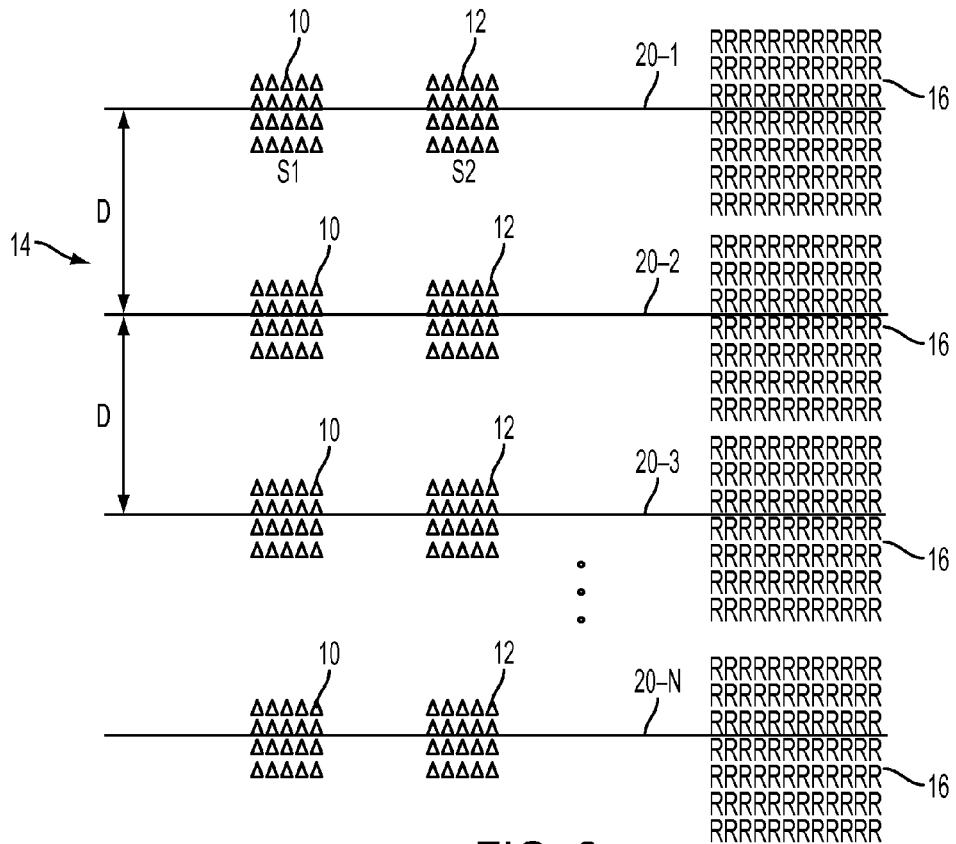
FIG. 2 is a top view of the earth and depicts schematically a configuration for a earth surface seismic application, according to another embodiment of the present invention.

FIG. 2 is a top view of the earth and depicts schematically a configuration for a earth surface seismic application, according to another embodiment of the present invention. In this embodiment, similar reference characters represent similar elements shown in FIG. 1. However, in FIG. 2, the first acoustic source 10, the second acoustic source 12 and the receiver 16 that are placed on earth surface 14 can be moved in an inline direction. Specifically, as shown in FIG. 2, the first acoustic source 10, the second acoustic source 12 and the receiver 16 that are placed on earth surface 14 are moved successively from inline direction 20-1 to inline direction 20-2, then to inline direction 20-3, . . . , and finally to inline direction 20-N, where N can be any integer number. At each inline direction 20-1, 20-2, 20-3, . . . , 20-N measurements are performed. Therefore, measurements are repeated at each of the inline directions 20-1 through 20-N. In this way, a two-dimensional (2D) image of non-linear properties of the subsurface in the vertical plane along the line 20-1, 20-2, 20-3, . . . , or 20-N or in a plane generally perpendicular to the surface 14 and containing line 20-1, 20-2, or 20-N can be constructed or obtained. The measurement along a line is repeated by moving the entire set-up, first acoustic source 10, second acoustic source 12 and receiver 16, on the earth surface 14 along a direction substantially perpendicular to line 20-1, 20-2, 20-3, etc. by a distance D. The distance D can be the same between two successive lines 20-1 and 20-2, 20-2 and 20-3, etc. or different. At each of the inline positions 20-1, 20-2, 20-3, . . . , 20-N a measurement is performed to obtain another 2D image of the non-linear properties. By repeating the measurement along a plurality of lines, a plurality of 2D images of non-linear properties can be obtained and thus a 3D image of non-linear properties of the earth beneath surface 14 can be obtained. The 3D image is created by combining the plurality of 2D images using 3D seismic processing imaging techniques commonly used in the seismic industry. In other words, each of the two dimensional images of non-linear properties of the earth obtained along each of the lines 20-1, 20-2, . . . , 20-N represents a slice of the 3D image of non-linear properties of the earth beneath surface 14.

In FIG. 2, the first acoustic source 10 and the second acoustic source 12 are shown being moved together along the axis substantially perpendicular to the lines 20-1, 20-2, etc. while maintaining the same separation between the sources 10 and 12. However, as it scan be appreciated the separation between the first acoustic source 10 and the second acoustic source 12 can be also be varied from one inline position (e.g., line 20-1) to another inline position (e.g., line 20-2 or line 20-3, etc.). Furthermore, the separation between the receiver 30 and one of the sources 10 or 12 can be maintained constant or varied from one inline position to another inline position.

Figure 3:
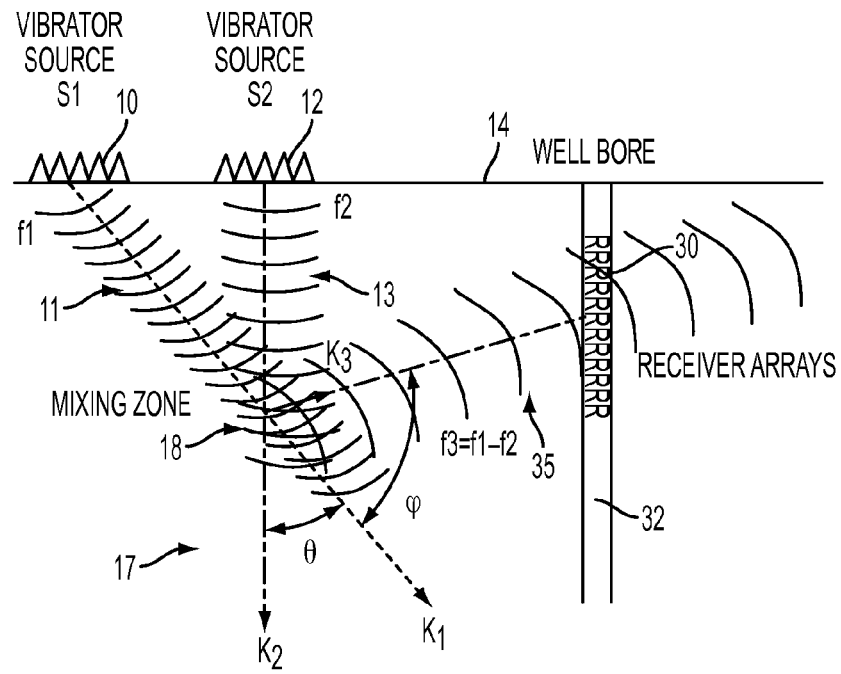
FIG. 3 is a cross-sectional view of the earth and depicts schematically a configuration for an earth surface seismic application, according to another embodiment of the present invention.

FIG. 3 is a cross-sectional view of the earth and depicts schematically a configuration for an earth surface seismic application, according to another embodiment of the present invention. This embodiment is similar to many aspects to the embodiments described above with respect to FIG. 1. In FIG. 3, same reference characters are used to indicate same elements as in FIG. 1. However, in this embodiment, a receiver 30 is provided within a borehole 32. The receiver or receiver array (R) 30 is disposed at a position spaced apart from the first acoustic source 10 and the second acoustic source 12. The receiver 30 is positioned in a plane containing the first acoustic source 10 and the second acoustic source 12. The receiver 30 is configured to detect a third acoustic wave 35 that is generated by a non-linear interaction of the first acoustic wave 11 and the second acoustic wave 13 within the rock formation 17 at a mixing zone 18. The non-linear properties of the earth at the location between the two waves 11 and 13, i.e., at the mixing zone 18, result in the generation of the third wave 35. The strength of the third wave 35 is a function the non-linearity of the rocks in the mixing zone 18.

Similar to the above embodiment of FIG. 1, the third acoustic wave 35 has a frequency f3 equal to a difference between the first frequency f1 of the first acoustic wave 11 and the second frequency f2 of the second acoustic wave 13.

The selection rules for non-collinear non-linear mixing govern the relationship between the first frequency f1 of the first acoustic wave 11 and the second frequency f2 of the second acoustic wave 13. The selection rules also govern the intersection angle θ between a first wave vector k1 of the first acoustic wave 11 and a second wave vector k2 of the second acoustic wave 13 as well as the velocity ratio Vp/Vs between compressional velocity Vp and shear velocity Vs and the angle φ between a third wave vector k3 of the third acoustic wave 35 and the first wave vector k1 of the first acoustic wave 11.

By providing the receiver 30 inside the borehole 32, the angle φ between a third wave vector k3 of the third acoustic wave 35 and the first wave vector k1 of the first acoustic wave 11 can be reduced hence further facilitating detection of the acoustic wave 35. As it can be appreciated, the position of the receiver 30 within the borehole 32 can be varied as desired to detect the acoustic wave 35. Furthermore, although the borehole 32 is shown relatively vertical relative to earth surface 14, as it can be appreciated, the borehole is not limited to this configuration. Indeed, in one embodiment, the borehole 32 can be angled or tilted relative to earth surface 14. In another embodiment, the borehole 32 can be curved. For example, the borehole 32 may be curved such that a portion of the borehole 32 may be relatively horizontal. The receiver 30 can be positioned within any portion of the borehole 32 including an inclined or angled portion relative to the surface 14 or positioned within a portion of a curved borehole that is relatively horizontal.

Figure 4:
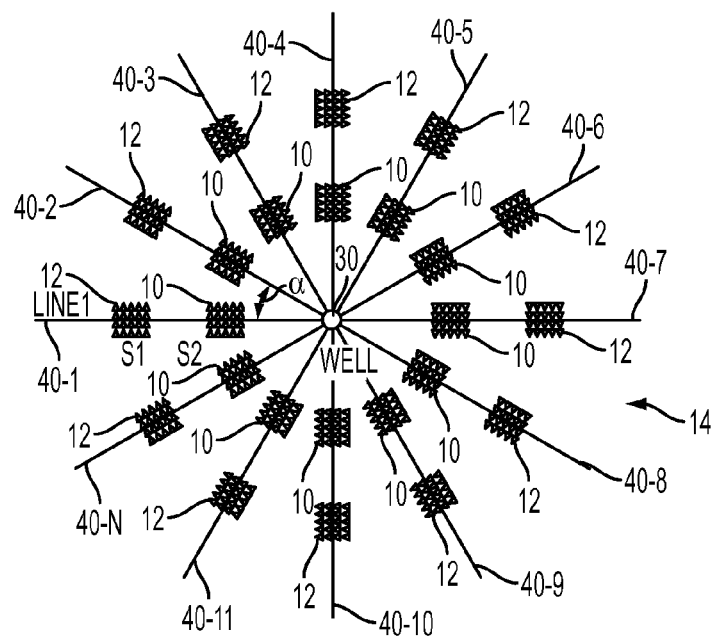
FIG. 4 is a top view of the earth and depicts schematically a configuration for a earth surface seismic application, according to another embodiment of the present invention.

FIG. 4 is a top view of the earth and depicts schematically a configuration for a earth surface seismic application, according to another embodiment of the present invention. This embodiment is similar in many aspects to the embodiment described above with respect to FIG. 2. Therefore, in this embodiment, similar reference characters represent similar elements shown in FIG. 2. However, in FIG. 4, the first acoustic source 10 and the second acoustic source 12 are placed spaced apart on earth surface 14 and are moved together around the axis of the borehole 32. The receiver 30 is disposed inside the borehole 32, as shown in FIG. 3. As shown in FIG. 4, the first acoustic source 10 and the second acoustic source 12 are moved or rotated in a circle around the axis of the borehole 32 (i.e., the axis passing through the receiver 30), successively from inline direction 40-1 to inline direction 40-2, then to inline direction 40-3, 40-4, 40-5, 40-6, 40-7, 40-8, 40-9, 40-10, 40-11, and finally to inline direction 40-N, where N can be any integer number. At each inline direction 40-1, 40-2, 40-3, . . . , 40-N measurements are performed.

Measurements are repeated at each of the inline directions 40-1 through 40-N. In this way, a two-dimensional (2D) image of non-linear properties of the sub-surface in the vertical plane along the line 40-1, 40-2, 40-3, . . . , 40-N can be constructed or obtained. The measurement along a line is repeated by moving the first acoustic source 10 and second acoustic source 12 on the earth surface 14 around the axis of the borehole 32 by a desired angular interval α. The angular interval α can be the same between two successive lines 40-1 and 40-2, 40-2 and 40-3, etc. or can also be different. At each of the inline positions 40-1, 40-2, 40-3, . . . , 40-N a measurement is performed to obtain another 2D image of the non-linear properties. By repeating the measurement along a plurality of lines, a plurality of 2D images of non-linear properties can be obtained which are subsequently combined by using various 3D imaging techniques in the seismic industry to create a 3D image of non-linear properties of the earth beneath surface 14 surrounding borehole 32. In FIG. 4, the first acoustic source 10 and the second acoustic source 12 are shown being moved or rotated together around the axis of the borehole 32 while maintaining the same separation between them. However, as it scan be appreciated the separation between the first acoustic source and the second acoustic source can be also be varied from one inline position (e.g., line 40-1) to another inline position (e.g., line 40-2 or line 40-3, etc.). Furthermore, the position of the receiver 30 (at a certain depth) within the borehole can be maintained constant or varied from one inline position or angular position to another inline position or angular position. Similarly, a radial distance separating the receiver 30 and one of the source 10 or 12 can be maintained constant or varied from one inline or angular position to another inline or angular position.

Although two configurations are described above while referring to FIGS. 1-4, as it can be appreciated, the source and receiver arrangements or configurations are not limited to the configurations described with respect to FIGS. 1-4 but can encompass other arrangements or configurations. For example, in one embodiment, an acoustic source can be positioned inside the borehole, while another acoustic source and the receiver can be positioned on the surface. In another embodiment, an acoustic source can be positioned on the surface while another acoustic source and the receiver can be positioned inside the borehole. Furthermore, in yet other embodiments, the first source and the second source may be placed in two different boreholes while the receiver can be positioned on the surface, or one source and the receiver can be placed in two different boreholes while the other source can be positioned on the surface.

In one embodiment, it is possible to code the acoustic waves 11 and 13 from acoustic sources 10 and 12, respectively, and detect the non-linear response of the medium or acoustic wave 15, 35 and process the detected non-linear acoustic wave 15, 35 on a computer to generate a band-limited spike acoustic signal that emulates a micro-seismic event occurring at the non-linear interaction mixing zone 18 of the coded acoustic waves 11 and 13 in the medium or subsurface rock formation. The band-limited spike acoustic signal is referred to herein as the emulated micro-seismic event originating from the non-linear interaction. Various embodiments of the present disclosure describe a method and a system to:

a) set up suitable measurement configuration of sources and receivers to probe the medium remotely and to detect the non-linear response of the medium;

b) code the acoustic source signals;

c) process the coded detected signals on a processor to generate measurement responses at detectors or receivers that correspond to emulated micro-seismic events at specific locations in the medium for which the strengths of the events are proportional to the non-linear properties of the medium; and d) process the emulated micro-seismic events to generate three dimensional 2D or 3D images of the non-linear properties and the propagation velocity model of the medium.

In one embodiment, the first acoustic sources (S1) 10 and (S2) 12 are configured to generate coded acoustic signals. In other words, the acoustic waves 11 and 13 generated by the acoustic sources 10 and 12, respectively, include coded acoustic signals. A coding scheme can be selected so as to achieve desired mixing characteristics within the medium.

In one embodiment, the coded signals for the two primary acoustic waves 11 and 13 can mix in the medium or subsurface rock formation 17 and generate by non-linear interaction an inherited specific coded signal for the third acoustic wave 15, 35. The measurement of the coded returning signal 15, 35 from the non-linear interaction in the medium 17 can be correlated with a template coded signal which can be computed from the selection rules of non-linear mixing in the region where the mixing occurs.

For example, given an appropriate start time difference $\delta$ between primary coded acoustic signals within acoustic waves 11 and 13 and given a frequency ratio between the frequencies f1 and f2 of the coded acoustic signals within acoustic waves 11 and 13, the resulting signal generated from each zone of non-linear interaction corresponds to the third acoustic wave 15, 35. The third acoustic wave 15, 35 can be decoded, for example, by a correlation processing technique to isolate or find an acoustic pulse signal originating from or generated by the non-linear interaction. The decoded acoustic pulse signal can be considered as a frequency band-limited acoustic signal generated by an emulated micro-seismic event generated at the intersection of the wavefronts of the two primary waves 11 and 13. The strength of the pulse is proportional to the non-linear properties of the zones of interaction 18 and the product of strain amplitudes of the primary waves 11 and 13. A travel time to the receiver 16, 30 corresponds to a sum of travel time from the acoustic source 10 or acoustic source 12 to a locus of the zone of non-linear interaction (interaction zone or mixing zone) 18 and a travel time of the third wave 16A from the locus of interaction 18 to receiver 16, 30.

Figure 5:
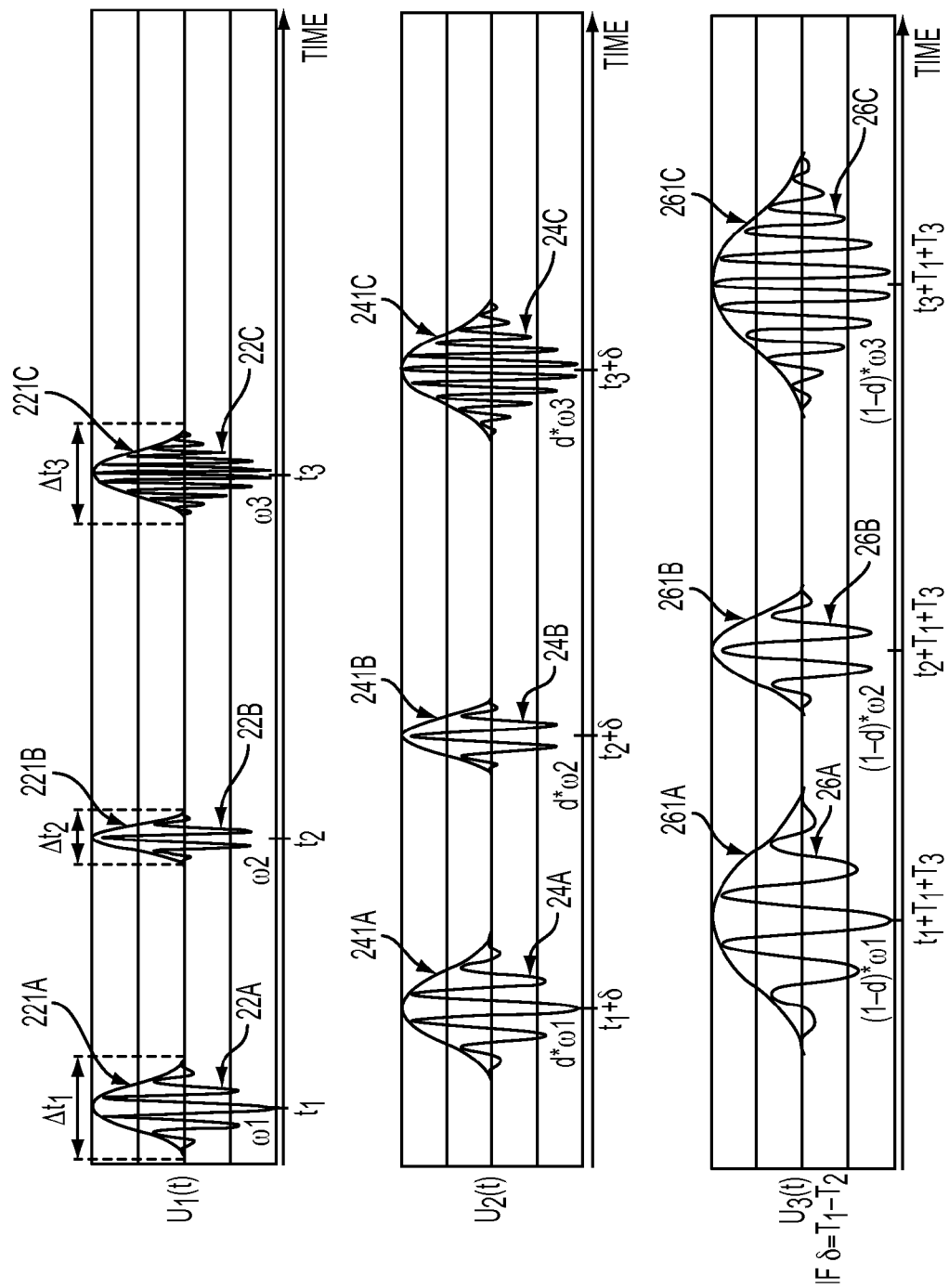
FIG. 5 shows a first acoustic signal generated by the first source, a second signal acoustic signal generated by second source and a third acoustic signal which results from a non-linear mixing of the first acoustic signal and the second acoustic signal in a non-linear mixing zone, according to an embodiment of the present invention.

FIG. 5 shows a first acoustic signal $u_1$ generated by the first source 10, a second signal acoustic signal $u_2$ generated by second source 12 and a third acoustic signal $u_3$ which results from a non-linear mixing of the first acoustic signal $u_1$ and the second acoustic signal $u_2$ in a non-linear mixing zone 18, according to an embodiment of the present invention.

In one embodiment, the first acoustic source 10 broadcasts a compressional (P) wave (e.g., a plane wave or a beam wave) with the $u_1$ signal comprising a plurality or train of pulses of acoustic signals. In one embodiment, the plurality of acoustic pulses are spaced apart in time such that there is no overlap of pulses. Each pulse has a modulated acoustic signal at a central frequency $\omega_m$, where m=1 through M and M is the number of pulses in the first plurality of pulses. Each acoustic pulse has an amplitude envelope with a given time duration. The broadcast central frequencies $\omega_m$ are staged sequentially at fixed time intervals during the entire signal broadcast.

The second acoustic source 12 broadcasts a compressional (P) wave (e.g., a plane wave or a beam) with the $u_2$ signal comprising a plurality or train of pulses of acoustic signals. The second plurality of acoustic pulses of $u_2$ signal have the same time spacing between centers of the pulses as the time spacing between centers of the pulses in the first plurality of pulses of $u_1$ signal. Each pulse has a modulated acoustic signal at a central frequency $(d*\omega_m)$ where m=1 through M and M is the number of pulses in the first plurality of pulses and d is a fixed frequency ratio for all the pulses. Each acoustic pulse has an amplitude envelope with a time duration. As it can be appreciated, the symbol "*" is used herein as a multiplication operator.

An embodiment of the broadcast coded signals is shown in FIG. 5 in which first three pulses of the plurality of pulses of $u_1$ signal are shown. The first acoustic signal $u_1$ is depicted as having a first pulse 22A, a second pulse 22B and a third pulse 22C. The first pulse 22A is generated at time $t_1$. The first pulse has a time width or time duration $\Delta t_1$. The first pulse 22A has a first envelope 221A and a first modulated signal therein having a first central frequency $\omega_1$. The second pulse 22B is generated at time $t_2$. The second pulse has a time width or time duration $\Delta t_2$. The second pulse 22B has a second envelope 221B and a second modulated signal therein having a second central frequency $\omega_2$. The third pulse 22C is generated at time $t_3$. The third pulse has a time width or time duration $\Delta t_3$. The third pulse 22C has a third envelope 221C and a third modulated signal therein having a third central frequency $\omega_3$. In one embodiment, for example as shown in FIG. 5, the first envelope of the first pulse 22A, the second envelope of the second pulse 22B and the third envelope of the third pulse 22C are different. However, envelopes of pulses 22A, 22B and 22C can be the same. In one embodiment, the first frequency $\omega_1$, the second frequency $\omega_2$ and the third central frequency $\omega_3$ are different. The first plurality of pulses 22A, 22B and 22C are separated in time (t1 is different from t2 which is different from t3). In addition, central frequencies (e.g., $\omega$1 and $\omega$2) of two consecutive pulses 22A and 22B, for example, are different. Although, the first signal $u_1$ is depicted in FIG. 5 as having 3 pulses, as it can be appreciated the first acoustic signal $u_1$ can have one or more pulses (i.e., m is equal 1 to M pulses, where M is an integer number equal to or greater than 1).

The second compressional acoustic source 12 broadcasts acoustic signals of many frequencies $(d*\omega_m)$, where d is a fixed frequency ratio for all values of m with an amplitude envelope and the frequencies sequentially at the same fixed time intervals as the first acoustic signal u1. For example, as shown in FIG. 5, the second acoustic signal is depicted as having a first acoustic pulse 24A, a second acoustic pulse 24B and a third acoustic pulse 24C. The first pulse 24A is generated at time $(t_1+\delta)$, where $\delta$ is the start time difference between the generation of the first acoustic signal and the second acoustic signal. In other words, $\delta$ corresponds to a start time difference provided between a start time of a broadcast of the first plurality of pulses 22A, 22B and 22C and a start time of a broadcast of the second plurality of pulses 24A, 24B and 24C. The first acoustic pulse 24A has a first envelope 241A and a first modulated signal therein having first central frequency $(d*\omega_1)$, where d is the frequency ratio between the frequencies of the modulated signals within the acoustic pulse 22A, 22B or 22C in the first acoustic signal u1 and the modulated signals within the corresponding acoustic pulse 24A, 24B or 24C, respectively, of the second acoustic signal $u_2$. The second acoustic pulse 22B is generated at time $(t_2+\delta)$. The second acoustic pulse 24A has a second envelope 241B and a second modulated signal therein having a second central frequency $(d*\omega_2)$. The third acoustic pulse 24C is generated at time $(t_3+\delta)$. The third pulse 24C has a third envelope 241C and a third modulated signal therein having a third central frequency $(d*\omega_3)$. In one embodiment, for example as shown in FIG. 5, the first envelope of the first acoustic pulse 24A, the second envelope of the second acoustic pulse 24B, and the third envelope of the third acoustic pulse 24C are different. However, the envelopes of the pulses 24A, 24B and 24C can also be the same. In one embodiment, the first central frequency $(d*\omega_1)$, the second central frequency $(d*\omega_2)$, and the third central frequency $(d*\omega_3)$ are different. A separation in time between centers of two consecutive pulses (e.g., 24A and 24B) in the second plurality of pulses is the same as a separation in time between centers of two corresponding pulses (22A and 22B) in the first plurality of pulses. In one embodiment, a separation in time between centers of two consecutive pulses (e.g., 22A and 22B) in the first plurality of pulses can be greater than a time duration of each pulse (i.e., greater than time duration $\Delta t_1$ and time duration $\Delta t_2$). Although, the second acoustic signal $u_2$ is depicted in FIG. 5 as having 3 pulses, as it can be appreciated the second acoustic signal $u_2$ can have one or more pulses (i.e., m pulses, where m is an integer equal to or greater than 1).

The acoustic signals $u_1$ and $u_2$ can be represented mathematically by the following relations (3) and (4), respectively.

$$u_1(t) = \sum_m E1_m(t - T_m) * \exp(i\omega_m * (t - T_m)) * \exp(i\zeta_m) \quad (3)$$

and $$u_2(t) = \sum_m E2_m(t - (T_M + \delta)) * \exp(id*\omega_m * (t - (T_m + \delta))) * \exp(i\zeta_m) \quad (4)$$

where m is a index number associated with a pulse;
$\Sigma$ denotes a summation over index m=1 to M, with M being an integer equal or greater than 1;
$E1_m(t-t_m)$ is an amplitude envelope of pulse m of the first acoustic signal $u_1$;
$E2_m(t-t_m-\delta)$ is an amplitude envelope of pulse m of the second acoustic signal $u_2$;
$\omega_m$ is the central frequency of the modulated signal of pulse m of the first acoustic signal $u_1$;
$(d*\omega_m)$ is the central frequency of the modulated signal of pulse m of the second acoustic signal $u_2$;
d is a frequency ratio between the frequency $\omega_m$ and frequency $d*\omega_m$, where d is a real positive number;
$\delta$ is the start time difference between the generation of the first acoustic signal $u_1$ and the second acoustic signal $u_2$;
$\exp(i\omega_m(t-t_m))$ is the modulated signal within the pulse m of the first acoustic signal $u_1$;
$\exp(id*\omega_m(t-t-t_m-\delta))$ is the modulated signal within the pulse m of the second acoustic signal u2;
$t_m$ is the time pulse m is generated in the first acoustic signal $u_1$;
$t_m+\delta$ is the time pulse m is generated in the second acoustic signal $u_2$; and
$\exp(i\zeta_m)$ is a phase term of each pulse m within the first signal $u_1$ or the second signal $u_2$.

In one embodiment, frequencies $\omega_m$ and $\omega_{m+1}$ of two consecutive pulses m and m+1 are selected to be different from each other such that the difference between the frequencies $\omega_m$ and $\omega_{m+1}$ denoted as $(\omega_m-\omega_{m+1})$ is not small compared with $\omega_m$. In one embodiment, the range of frequencies $\omega_m$ is relatively large, spanning one or more octaves. In one embodiment, the time separation (t1-t2) between two adjacent time periods t1 and t2 is larger than the time duration $\Delta t_m$ of a pulse m (where m is an integer number equal to or greater than 1). In other words, the time difference $(t_{m+1}-t_m)$ between consecutive pulses m and m+1 is greater than $\Delta t_m$ (i.e., $\Delta t_m \ll (t_{m+1}-t_m)$) and the time difference $(t_m-t_{m-1})$ between consecutive pulses m-1 and m is greater than $\Delta t_m$ (i.e., $\Delta t_m \ll (t_m-t_{m-1})$).

When the first acoustic signal $u_1$ and the second acoustic signal $u_2$ non-linearly mix at a certain distance, the non-linear mixing generates a third acoustic signal $u_3$. The third acoustic signal $u_3$ comprises a series of acoustic pulses, each acoustic pulse having an envelope and a modulated signal. For the mth pulse in the signal $u_3$, the modulated signal of the mth pulse in the $u_3$ signal has a central frequency equal to a difference between a frequency $\omega_m$ of a modulated signal of the first acoustic signal and a frequency $(d*\omega_m)$ of a modulated signal of the second acoustic signal, i.e., $(\omega_m-d*\omega_m)$ or $((1-d)*\omega_m)$.

For example, as shown in FIG. 5, the third acoustic signal $u_3$ is depicted as having a first acoustic pulse 26A, a second acoustic pulse 26B and a third acoustic pulse 26C. These pulses 26A, 26B and 26C are generated at the mixing zone when the start time difference $\delta$ between the generation of the first acoustic signal and the generation of the second acoustic signal is equal to the time difference between $T_2$ and $T_1$, where $T_1$ is a travel time of the first acoustic signal $u_1$ from the first acoustic source 10 to a center of the mixing zone 18 and $T_2$ is a travel time of the second acoustic signal $u_2$ from the second acoustic source 12 to a center of the mixing zone 18. The first pulse 26A is received at time $t1+T_1+T_3$, where time $T_3$ is a travel time from the center of the mixing zone 18 where the third signal is generated to the receiver 16, 30. In one embodiment, a separation in time between centers of two consecutive pulses (e.g., pulses 26A and 26B) is the same as the separation in time between centers of two corresponding consecutive pulses in the first plurality of pulses (22A and 22B).

The first pulse 26A has an envelope 261A and a first modulated signal therein having a first central frequency $(1-d)*\omega_1$. The envelope of pulse 26A is broader than the envelope of pulse 22A in the first signal $u_1$ and pulse 24A in the second signal $u_2$. This first central frequency $(1-d)*\omega_1$ corresponds to a frequency difference between the central frequency $\omega_1$ of the first pulse 22A in the first signal $u_1$ and the central frequency $(d*\omega_1)$ of the second pulse 24A in the second signal $u_2$. The second pulse 26B is received at time $t_2+T_1+T_3$. The second pulse 26B has an envelope 261B and a second modulated signal therein having a second central frequency $(1-d)*\omega_2$. The envelope of pulse 26B is broader than the envelope of pulse 22B in the first signal $u_1$ and pulse 24B in the second signal $u_2$. This second central frequency $(1-d)*\omega_2$ corresponds to a frequency difference between a central frequency $\omega_2$ of the second pulse 22B in the first signal u1 and a central frequency $(d*\omega_2)$ of the second pulse 24B in the second signal $u_2$. The third pulse 26C is received at time $t_3+T_1+T_3$. The third pulse 26C has an envelope 261C and a third modulated signal therein having a third frequency $(1-d)*\omega_3$. The envelope of pulse 26C is broader than the envelope of the pulse 22C and pulse 24C. This central frequency $(1-d)*\omega_3$ corresponds to a frequency difference between a central frequency $\omega_3$ of the third pulse 22C in the first signal $u_1$ and a central frequency $(d*\omega_3)$ of the third pulse 24C in the second signal $u_2$. Therefore, an arrival time at the receiver of each pulse (e.g., pulse 26A, 26B or 26C) of the third plurality of pulses is time delayed relative to a generation of a corresponding pulse (22A, 22B or 22C) of the first plurality of pulses by a total of the travel time ($T_1$) from the first acoustic source to a center of the mixing zone and the travel time ($T_3$) from the center of the mixing zone to the receiver.

The third signal $u_3$ generated from a non-linear interaction of the first and second signals within the non-linear medium 17 at the mixing zone 18 can be expressed by the following mathematical formula (5).

$$u_3(t) \propto \sum_n E3_m(t - (t_m + T_1 + T_3)) * \exp(i * (1 - d) * \omega_m * (t - (t_m + T_1 + T_3))) * \exp(i\zeta_m) \quad (5)$$

where m is an index number associated with each pulse;
$\Sigma$ denotes a summation over index m=1 to M with M being an integer equal or greater than 1;
$E3_m(t-t_m-T_1)$ is an amplitude envelope of pulse m of the third signal $u_3$; $E3_m$ is an envelope function that is slightly wider than $E1_m$ and $E2_m$ and can be calculated from $E1_m$ and $E2_m$, $\omega_m$, d and the sizes of the mixing zones;
$(1-d)*\omega_m$ is the central frequency of the modulated signal of pulse m of the third signal $u_3$;
d is a frequency ratio between the frequency $\omega_m$ and frequency $d*\omega_m$, where d is a real positive number;
$\exp(i(1-d)*\omega_m*(t-t_m-T_1-T_3))$ is the modulated signal within the pulse m of third signal u3;
$t_m+T_1+T_3$ is the time pulse m in the third signal $u_3$ is received; and
$\exp(i\zeta_m)$ is a phase term of each pulse m within the third signal $u_3$.

In one embodiment, when $T_1-T_2=\delta$ (i.e., when the time difference $T_1-T_2$ between a travel time $T_1$ of a pulse m of the first acoustic signal u1 to a center of the mixing zone 18 and a travel time $T_2$ of a pulse m of the second acoustic signal $u_2$ to a center of the mixing zone 18 is equal to start time difference $\delta$ between the generation of the pulse m of the first acoustic signal $u_1$ and the pulse m of the second acoustic signal $u_2$, and a frequency ratio between the frequency $\omega_m$ of the modulated signal within a pulse m of the first acoustic signal and frequency $d\omega_m$ of the modulated signal within a pulse m of the second acoustic signal satisfies equation (1), there is complete alignment of all the pulses of the two coded broadcast signals $u_1$ and $u_2$ to generate the third wave $u_3$ with the coded signal as shown in FIG. 5. It can be shown that, in the absence of strong absorption Q propagation effect, the third wave is an effective broadcast from the center of the mixing zone 18 with the following inherited coded signal $u_3$ of equation (5).

For example, if $E1_m(t)$ and $E2_m(t)$ are chosen to be Gaussian functions then the amplitude of the envelope $E1_m(t-t_m)$ and $E2_m(t-t_m)$ of pulse m of the first acoustic signal $u_1$ can be expressed by equation (6).

$$E1_m(t-t_m)=E2_m(t-t_m)=\exp(-(t-t_m)^2/4(\Delta t_m)^2) \quad (6)$$

and the amplitude of the envelope $E3_m(t-t_m)$ can be expressed by equation (6).

$$E3_m(t-t_m)=\exp(-(t-t_m)^2/8(\Delta t_m)^2) \quad (7),$$

if the mixing zone is relatively large.

For example, if $E1_m(t)$ and $E2_m(t)$ are chosen to be Gaussian functions then the amplitude of the envelope $E1_m(t-t_m)$ and $E2_m(t-t_m)$ of pulse m of the first acoustic signal $u_1$ can be expressed by equation (6).

If either $T_1-T_2=\delta$ condition is not met or d does not satisfies equation (4), the selection rules for each pulse will not be satisfied. As a result, the resulting third wave $u_3$ will be diminished or attenuated. It should be noted that there will be additional complexity to the resulting third signal expressed in equation (3) if the earth absorption Q effect is large.

If $T_1-T_2=\delta$ and d satisfies equation (1), the detected signal $u_3(R,t)$ at a receiver R at 16, 30 will be the broadcast signal u3($M_c$,t) emanating from the center of the mixing zone $M_c$ 18 which is time delayed by the travel time $T_3$. Signal u3(R,t) at the receiver can be expressed by equation (7) as follows.

$$u_3(R, t) \propto \sum_n E3_m(t - T_m - T_1 - T_3) * \exp(i * (1 - d) * \omega_m * (t - T_m - T_1 - T_3))) * \exp(i\zeta_m) \quad (8)$$

If u3(R,t) is cross-correlated with the template signal us(t) expressed by the following equation (9).

$$u_s(t) = \sum_n W_m(t - T_m) * \exp(i * g(\omega_m) * (t - T_m)) * \exp(i\zeta_m), \quad (9)$$

where $W_m(t)$ is a selected or chosen envelope and $g(\omega_m)$ is a selected or chosen function of frequency as in standard signal processing of chirped signal, the resulting signal will be a frequency band-limited spike that occurs at time $t=T_1+T_3$ provided that the signals $u_1$ and $u_2$ compose a dense set of $\omega_m$ spanning the frequency range $\omega_{min}$ and $\omega_{max}$. The band-limited spike has the frequency range $(1-d)*\omega_{min}$ and $(1-d)*\omega_{max}$ or a frequency content composed of a series of discrete frequencies corresponding to each value of $(1-d)*(\omega 1_m-\omega 2_m)$ for m=1 through M. The function $g(\omega_m)$ in equation (9) can be selected appropriately. The selection of an appropriate function $g(\omega_m)$ may be based on the shape of the expected modulated signal within the measured signal $u_3$ to achieve the best non-linear signal extraction. $g(\omega_m)$ depends on frequency fraction d. For example, the function $g(\omega_m)$ can be selected such that $g(\omega_m)=(1-d)*\omega_m$. However, other functions can also be selected.

The band-limited spike is effectively a signal originating from a micro-seismic event that occurred at the mixing zone 18 at time $T_1$. The signal from the micro-seismic event at the mixing zone 18 propagates towards the receiver during time $T_3$. The receiver 16, 30 detects the signal at time $T_1+T_3$.

The correlated measured signal has the following properties. First, the correlated signal contains a sharp band-limited spike, corresponding to the non-linear interaction at the mixing zone 18, only if the start time difference $\delta$ between first and second primary coded signals is equal to the difference between the travel time $T_1$ from the first acoustic source 10 to the mixing zone 18 and the travel time $T_2$ from the second acoustic source 12 to mixing zone 18, i.e., $\delta=T_1-T_2$. If this condition is not met, the correlated signal is highly suppressed. Second, if the condition $\delta=T_1-T_2$ is met, the band-limited spike occurs on the correlated signal at the time T which is equal to a sum of the travel time from the first primary acoustic source 10 to the mixing zone 18 and the travel time from the mixing zone 18 to the receiver Ri within the receiver array 16, 30, as shown in FIGS. 1 and 3, i.e., $T=T_1+T_3=\delta+T_2+T_3$. Third, increasing the duration of the coded signal train, i.e., increasing the number of pulses M in the broadcast train (in the first signal $u_1$ and/or the second signal $u_2$), improves discrimination of signal from noise, because the noise does not have the form of the template signal $u_s$.

Figure 6A:
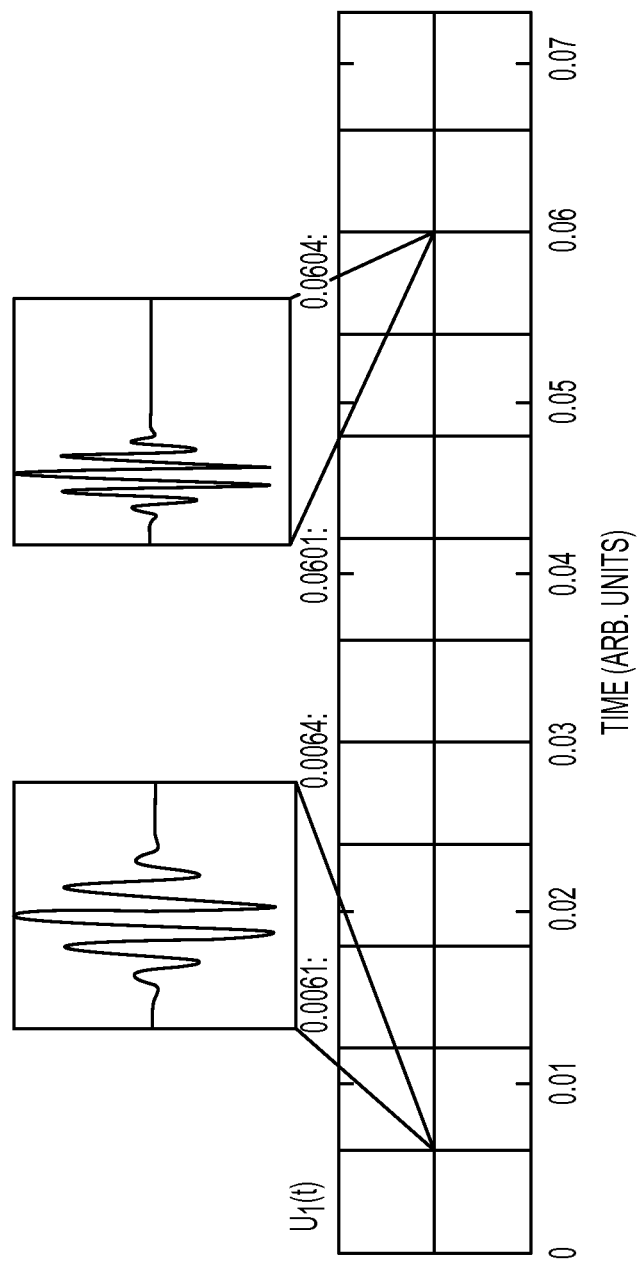
FIGS. 6A and 6B show, respectively, the coded signals from the first acoustic source and the second acoustic source, according to an embodiment of the present invention.
Figure 6B:
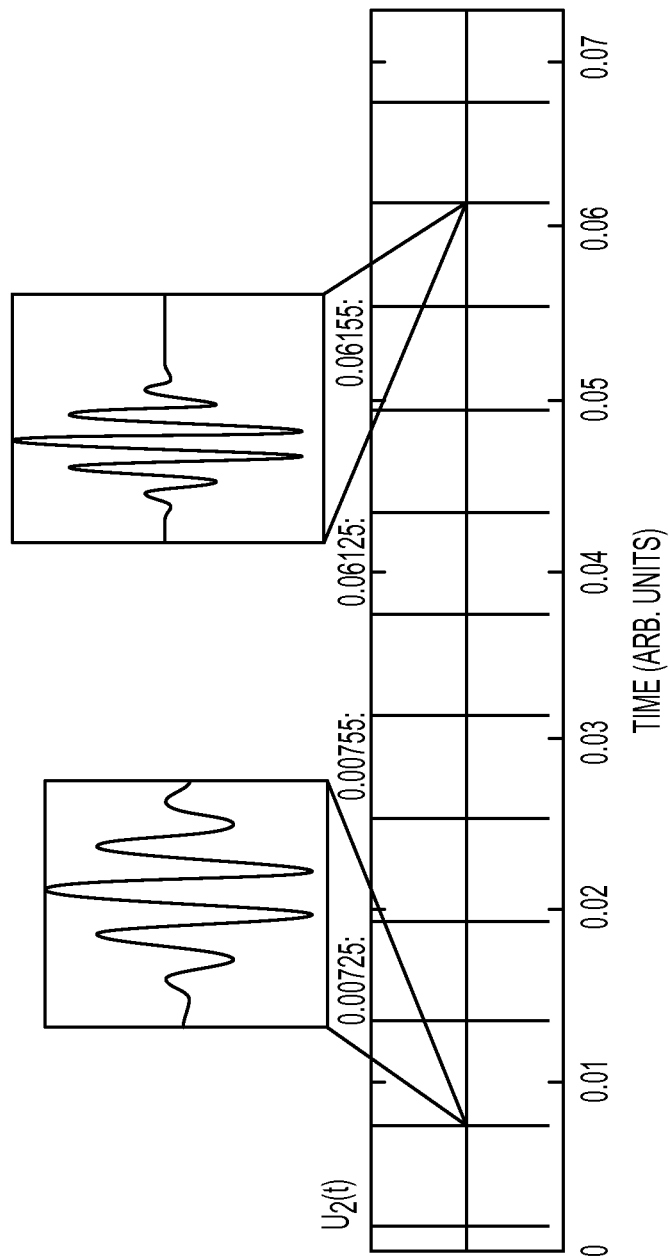
Figure 7A:
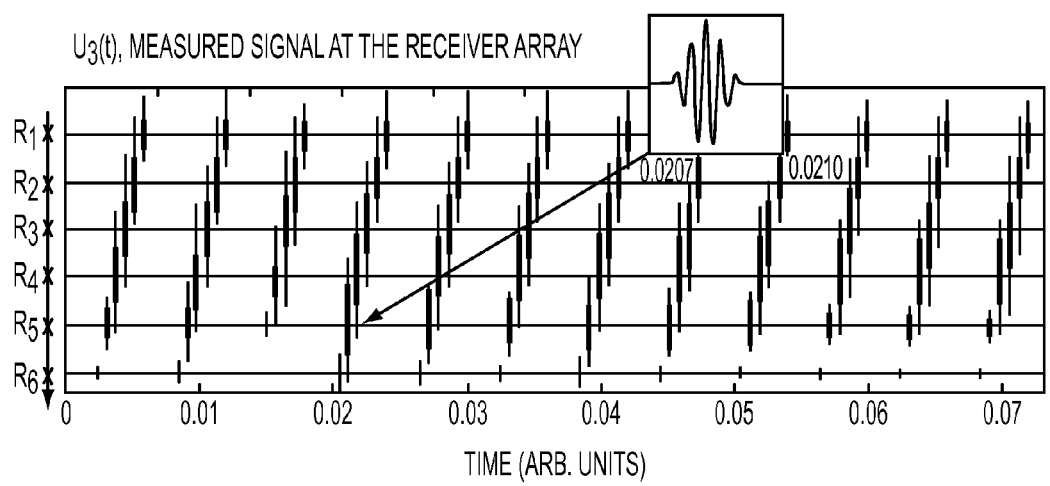
FIG. 7A shows computer simulated signals generated by non-linear interaction, from a broadcast of two pulse sequences, received and recorded at six receivers of a receiver array, according to an embodiment of the present invention.
Figure 7B:
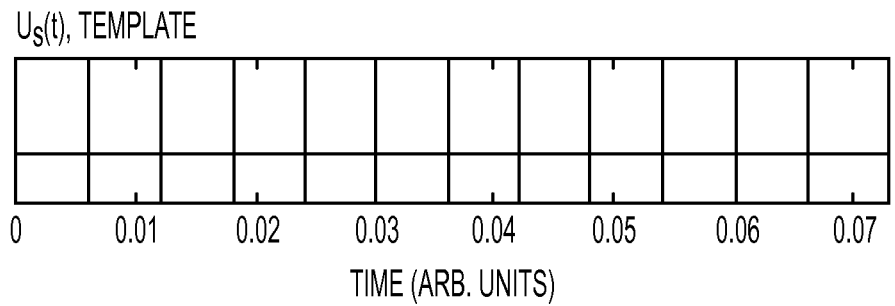
FIG. 7B depicts a template signal used to extract a correlated signal at the receiver array, according to an embodiment of the present invention.
Figure 7C:
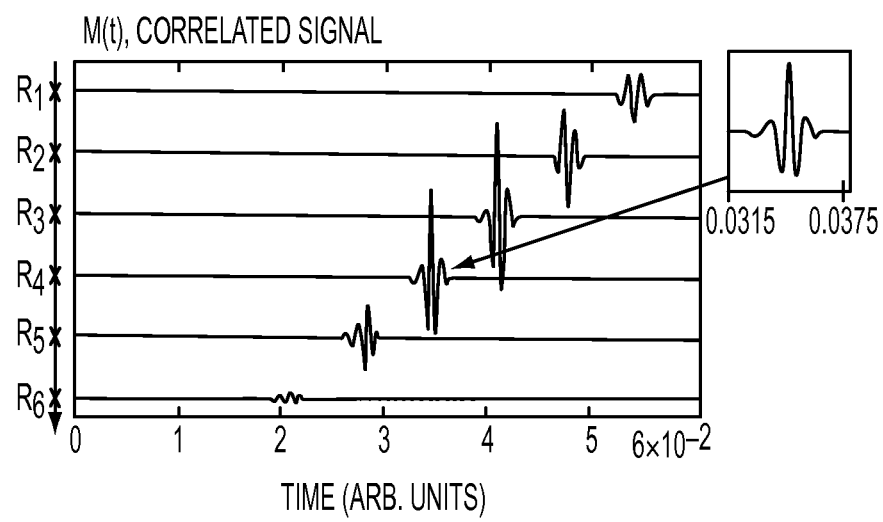
FIG. 7C shows the result of a correlation process between the template signal shown in FIG. 7B with the recorded or measured signal shown in FIG. 7A at each considered receiver, according to an embodiment of the present invention.

Numerical simulation resulting from a case where the first source 10 and second source 12 emit acoustic beams of coded signal trains $u_1(t)$ and $u_2(t)$ consisting of sequential acoustic pulses with Gaussian envelopes are shown in FIGS. 6A and 6B, respectively. In this non-limiting example, coded signals of 12 pulses are used with frequency pairs (22.960 Hz, 14.920 Hz) (24.960 Hz, 16.224) (28.000 Hz, 18.200 Hz) (30.280 Hz, 19.680 Hz) (32.080 Hz, 20.852) (34.820 Hz, 22.640 Hz) (37.880 Hz, 24.620) (40.000 Hz, 26.000 Hz) (44.800 Hz, 29.120 Hz) (48.720 Hz, 31.680 Hz) (52.960 Hz, 34.440 Hz) (57.600 Hz, 37.440 Hz). The frequency ratio $d=\omega_2/\omega_1$ between the pairs is a constant 0.65. The start time difference $\delta$ between the two signal trains $u_1$ and $u_2$ is chosen to be equal to $(T_1-T_2)$. Numerical simulation of the non-linear interaction due to the broadcast of the two coded wave trains $u_1$ and $u_2$ is performed on a computer. The emulated micro-seismic event signals due to non-linear interaction from a broadcast of two sequential pulses received and recorded at six receivers of a receiver array are shown in FIG. 7A. Each receiver $R_i$ 16, 30 is indexed from 1 to 6 and is shown on FIG. 7A with its distance in m along the receiver array. The template $u_s$ for the returning coded signal is shown in FIG. 7B. The result of correlation between the template signal with the recorded signal at each considered receiver is shown in FIG. 7C. The resulting correlated signal at each receiver shown in FIG. 7C shows a very sharp band-limited spike. This sharp band-limited spike occurs at the time $T=T_1+T_3$ where $T_1$ is the travel time from the source S10 to the center of the mixing zone 18 and $T_3$ is the travel time from the center of the mixing zone 18 to each receiver Ri 16, 30. In one embodiment, $T_3$ is different for each receiver Ri 16, 30 and is the cause of the move-out of the correlation spike along the receiver array, as shown on FIG. 7C.

The numerical simulation shown in FIGS. 3A-3C clearly illustrates the power and utility of the coding scheme. It allows for computer processing of the recorded signals at the receivers 16, 30 to generate correlated records that contain band-limited spike signals with strength proportional to the strength of the non-linear interaction at the mixing zone 18. The arrival time T of the band-limited spike is equal to the total travel time from source 10 to mixing zone 18 and back to receiver Ri 16, 30. The amplitude of the band-limited spikes vary with the receiver position with a maximum occurring at a particular receiver, the location of which is dependent on the scattering angle $\phi$ of the non-linear interaction at mixing zone 18. The scattering angle $\phi$ is dependent on the properties of the material or medium, e.g. Vp/Vs velocity ratio, at the mixing zone 18. It should be noted that this result is a characteristic of the coding scheme. The use of Gaussian envelopes and coded signals in conjunction with templates are non-limiting examples used for the purpose of illustrating the coding scheme and its characteristics. Variants of $u_1$, $u_2$ and $u_s$ can also be considered in order to optimize the performance of the correlation process in terms of resolution and signal-to-noise ratio in response to various considerations imposed by applications.

Figure 8A:
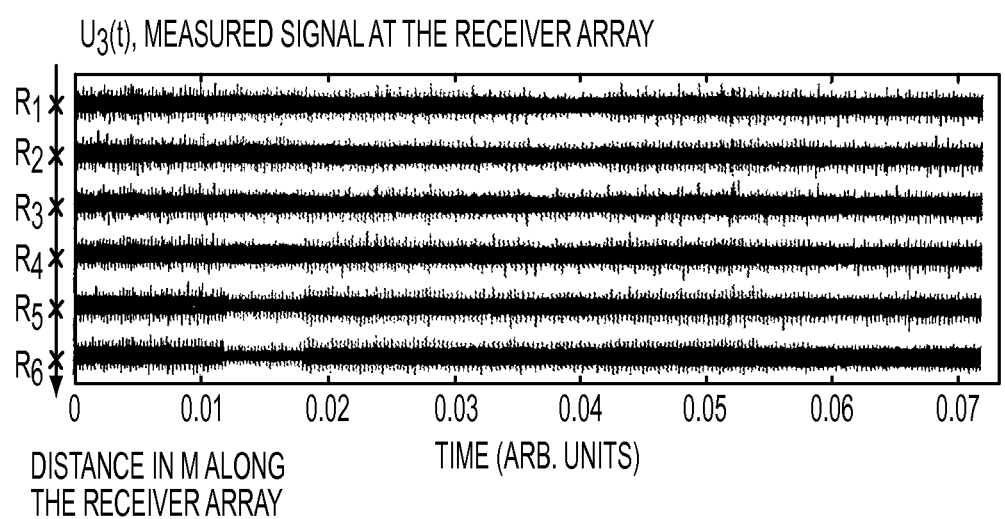
FIG. 8A shows a simulated received signal containing noise recorded at 6 receivers of the receiver array, according to an embodiment of the present invention.
Figure 8B:
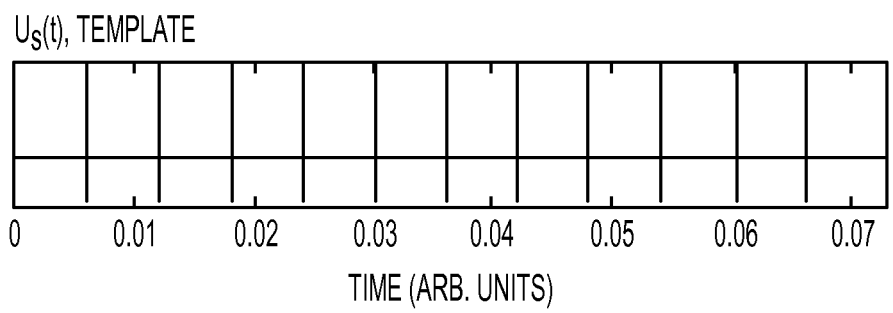
FIG. 8B shows an example of a template signal, according to an embodiment of the present invention.
Figure 8C:
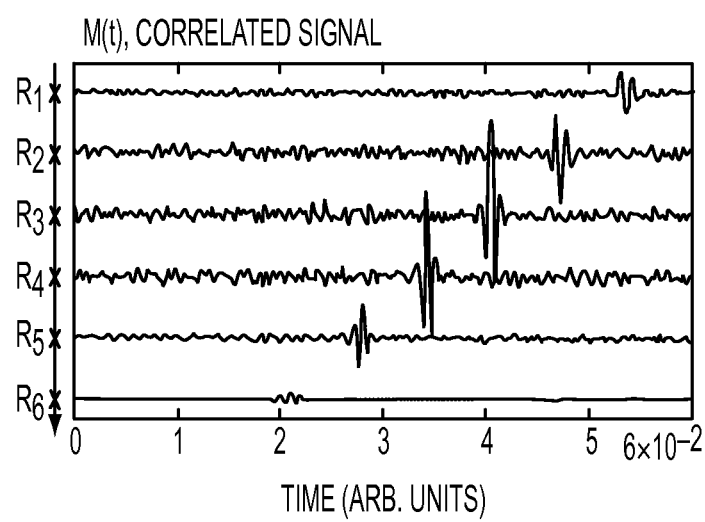
FIG. 8C shows the signal retrieved from the noisy signals on the same receivers when correlating the noisy signals shown in FIG. 8A with the coded template signal shown in FIG. 8b, according to an embodiment of the present invention.

In some aspects of the present disclosure, coded acoustic signals in the primary acoustic signal can also be used to enhance the amplitude and focusing of the non-linear signal propagating towards the receiver, and to improve signal detection sensitivity and signal to noise ratio. FIGS. 8A-8C show an example of an application of the coded signal scheme to a noisy time series signal generated by numerical simulation. The noisy times series signal simulates a signal returning to the borehole as a result of non-linear interaction. White Gaussian noise with an amplitude 10% larger than the amplitude of the non-linear interaction signal is added to the time-series signal produced by the numerical simulation of wave propagation in a non-linear model before the correlation with the coding template is applied. FIG. 8A shows the simulated received signal containing noise recorded at 6 receivers of the receiver array 16, 30. FIG. 8C shows the signal retrieved from the noisy signals (in this case the simulated noisy signals) on the same receivers when correlating with the coded template $u_s(t)$ of 12 pulses shown in FIG. 8B. The coding scheme is thus shown to effectively extract the signal from the non-linear interaction and minimize the noise, a useful characteristic for field applications.

When acoustic sources 10 and 12 emit acoustic waves instead of acoustic beams, the measurement M(Ri,t) of the coding and subsequent correlation of the measured signal at any receiver Ri 16, 30 in the medium 17, denoted as M(Ri,t), is the sum of all the acoustic pulses by all points Mc in the medium that satisfy the conditions T1−T2=$\delta$ and d satisfying equation (1). Hence, for every time difference and frequency ratio ($\delta$, d) pair, there are a number of Mc points, denoted as Mc($\delta$,d), that satisfy the conditions T1−T2=$\delta$ and d satisfying equation (1). The equation M(Ri,t) for each points i can be expressed by the following equation (10).

$$M(Ri, t) = \sum_{Mc(\delta, d)} A(Mc) * WB[t - T(S1, Mc) - T(Mc, Ri), (1-d)\omega_{min}, (1-d)\omega_{max}] \quad (10)$$

where A(Mc) is an amplitude factor that takes into account propagation effects and non-linear mixing strength at Mc;
where $\Sigma$ denotes a summation over all mixing zones with the center at Mc($\delta$,d);
where T(S1,Mc) is the travel time from source S1 to a particular Mc($\delta$,d);
where T(Mc,Ri) is the travel time from a particular Mc($\delta$,d) to receiver Ri; and
where WB(t, $\omega_{min}$, $\omega_{max}$) is a band limited spike with frequency range between $\omega_{min}$ and $\omega_{max}$.

Hence, as defined by Equation (10), the decoded measurement M(Ri,t) comprises a plurality of measurements of a number of micro-seismic events that occur at the locations Mc($\delta$,d) in the medium 17 with the receiving time of the micro-seismic events at a receiver Ri 16, 30 corresponding to the total travel time from source 10 to the locations Mc($\delta$,d) and from the locations Mc($\delta$,d) to the receiver Ri 16, 30. It should be noted, however, that the strength of the micro-seismic event is proportional to the non-linear properties of the rock at the location of the micro-seismic event locations Mc($\delta$,d) after correction for the propagation effects and mixing kinematic effects.

As it can be appreciated, the coding scheme shown in FIG. 5 is only one example of a coding scheme allowing for measurements that can be processed into emulated micro-seismic events. There are many variations to this coding scheme. For example, in one embodiment, the period between the pulses for each frequency can be variable with specified time intervals that can be random or periodic. In one embodiment, the amplitude of each pulse can be variable with specified values that can be random or periodic. In one embodiment, the signal time period (i.e., times period between pulses) can be variable. In one embodiment, the modulated signal with the pulse may itself be a composition or a superposition of a sequence of modulated signals arranged at variable listening periods in between the modulated signals so as, for example, to enhance signal to noise ratio of the emulated micro-seismic events. As it can be appreciated, the above embodiments can be implemented separately or combined in any desired fashion to achieve any desired coding scheme.

Figure 9:
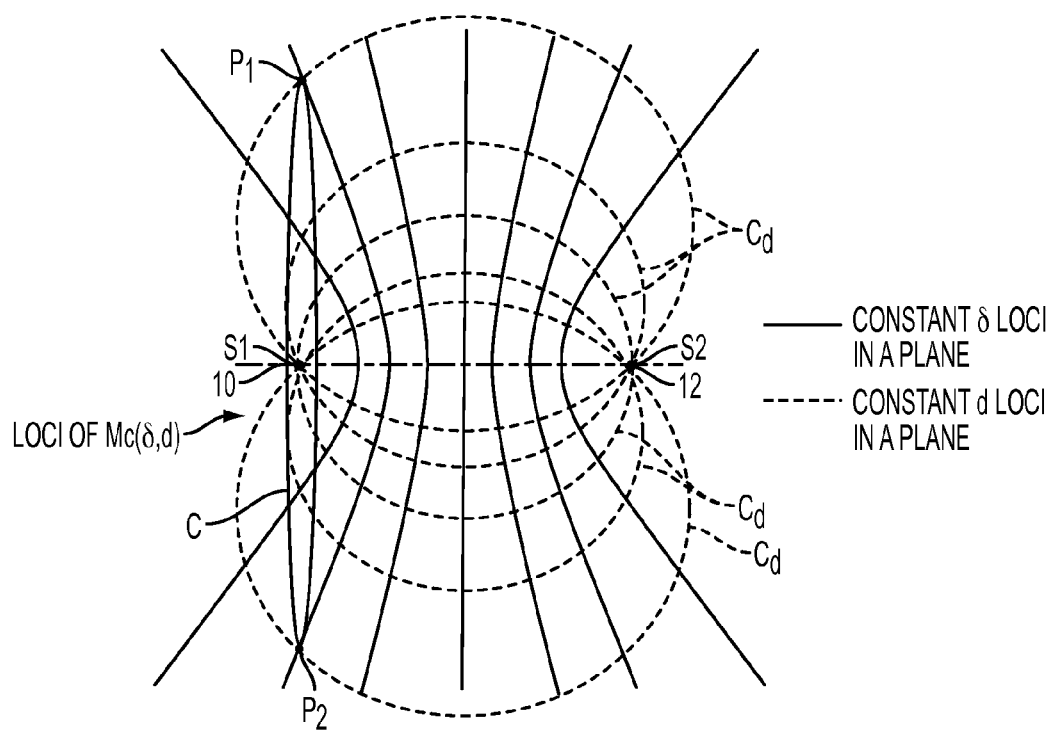
FIG. 9 shows a position of the locations mixing zones $Mc(\delta, d)$, for a pair $(\delta, d)$ of start time difference $\delta$ between the first acoustic signal and the second acoustic signal and frequency ratio d, in a plane containing the first acoustic source and the second acoustic source when the medium has constant acoustic velocities of propagation but variable non-linear earth parameters, according to an embodiment of the present invention.

FIG. 9 shows a position of the locations Mc($\delta$, d) in a plane containing the first acoustic source S1 10 and the second acoustic source S2 12 when the medium has constant acoustic velocities of propagation but variable non-linear earth parameters, according to an embodiment of the present invention. The loci of points of constant $\delta$ are vertically oriented hyperbolas in a plane containing the sources S1 10 and S2 12. The loci of the points at constant frequency ratio d define a plurality of circles $C_d$. The center of the circles $C_d$ is on the bisector line of the S1 10 to S2 12 segment. The circles pass through the points S1 and S2 in the same plane. Therefore, for each ($\delta$, d) pair, there are exactly two points (e.g., $P_1$ and $P_2$) in a plane for Mc($\delta$, d). By rotating the plane around the S1S2 axis, the loci of Mc($\delta$, d) can be defined as a circle C($\delta$, d), having a center on the S1S2 axis for each ($\delta$, d) pair. If all values of ($\delta$, d) pairs are scanned, micro-seismic events for all locations in the volume space in the medium surrounding the S1S2 line can be created.

It can be seen that when the assumption of constant acoustic velocity is relaxed, the loci of Mc($\delta$, d) would be more complex due to propagation effects, e.g., ray bending and wave front complexity. However, regardless of complexity within the non-linear medium (e.g., different wave front velocities, etc.), micro-seismic events can be emulated to occur at the intersection of the wavefronts from the two sources S1 10 and S2 12 with the measurement and coding scheme described above.

Figure 10:
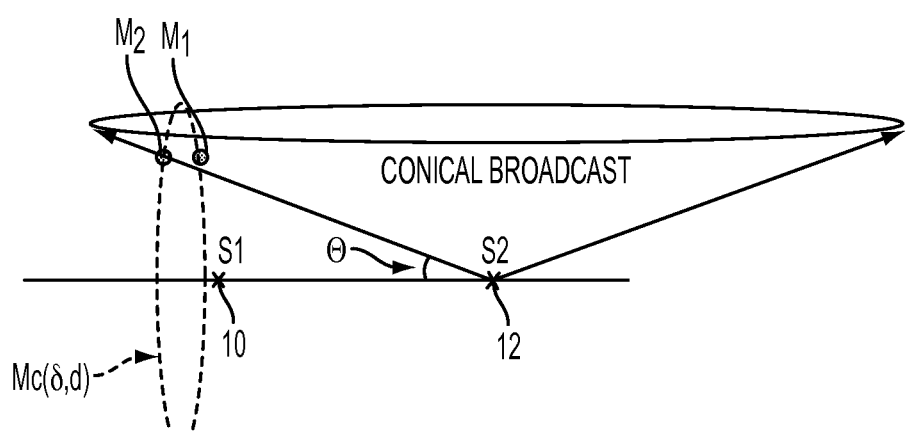
FIG. 10 depicts a situation where the first acoustic source is a source for generating an acoustic wave and the second acoustic source generates a conical acoustic broadcast, according to an embodiment of the present invention.

In one embodiment, the emulated micro-seismic events can be localized even further if acoustic sources S1 10 and S2 12 have a beam radiation pattern. FIG. 10 depicts a situation where acoustic source S1 10 is an array source for generating a beam of radiation, according to an embodiment of the present invention. In one embodiment, the array source S1 10 is positioned perpendicular to S1S2 axis. By suitable start time difference of source elements, an array source S1 can generate acoustic waves at a specific inclination to the S1S2 axis. The acoustic wavefront of source S1 10 is restricted to a cone, for example. As shown in FIG. 10, the axis of the cone is perpendicular to the S1S2 axis. Therefore, emulated micro-seismic events are restricted to two points $M_1$ and $M_2$ in the medium at the intersection of the cone and loci circle C($\delta$, d) as shown in FIG. 10. Thus, the radiation beam patterns of S1 and S2 control where the emulated micro-seismic events can occur in the medium.

In earthquake seismology, by assuming a model of the acoustic propagation velocities of the medium, a time reversal operation can be performed on seismic measurements. The time reversal modeling operation can refocus the acoustic wave back to a peak at the time of origination of the seismic event. The strength of the focused energy peak at the time of origination is a function of the strength of the initial seismic event. The general concept of time reversal has generated many applications in the field of acoustics. The general time reversal methodology commonly known as reverse time migration or RTM has been applied to imaging in a complex medium such as in the exploration of oil and gas (see, George A. McMechan, Determination of source parameters by wavefield extrapolation, Geophysical Journal of the Royal Astronomical Society, Volume 71, Issue 3, pages 613-628, December 1982), the entire contents of which is incorporated herein by reference.

The time reversal methodology can be applied to the emulated micro-seismic measurements described in the above paragraphs. In the present application, the time reversal operations can focus the waves back to the time and place of origination (i.e., to positions Mc($\delta$, d) and time T(S1,Mc) as noted in the above paragraphs) of the micro-seismic events. As stated in the above paragraphs, the strengths of the micro-seismic events at the time of origination are proportional to the non-linear properties at the location of the micro-seismic events. Therefore, the time reversal operation can be used as a tool for the determination of relative values of the non-linear properties at the points of origination Mc($\delta$, d). Hence, if the time reversal operation is performed on the emulated micro-seismic events for all pairs of ($\delta$, d), the non-linear properties at all locations Mc($\delta$, d) can be quantified. By combining the values of non-linear properties of all locations Mc($\delta$, d), three dimensional (3D) images of relative strength of the non-linear properties of the medium around the source S1 and S2 can be constructed.

Conventional standard imaging methods in exploration seismology such as Kirchhoff, Beam and Wave Equation Migration can also be modified and applied to the present non-linear acoustic interaction to develop 3D images of the relative strength of the non-linear properties of the medium from the measurements of the emulated micro-seismic events assuming a propagation velocity model of the medium. Other advanced inversion methods known to various industries can be applied to the emulated micro-seismic events.

In an embodiment of the use of the Kirchhoff imaging methodology for the emulated micro-seismic events resulting from a non-linear interaction of two acoustic waves in a non-linear medium is described in detail in the following paragraphs.

In one embodiment, the emulated micro-seismic events can be expressed as M(Ri, t). For every given point Mc in a medium, the travel time T(Ri,Mc) from the interaction zone Mc to the receiver Ri of the receiver array 16, 30 (e.g., R1, R2, etc.) and the travel time T(S1, Mc) from acoustic source S1 10 to receiver (e.g., R1, R2, etc.) 16, 30 can be computed using the propagation velocity model. In one embodiment, the amplitude of the wave propagation A(S1,Mc) from source S1 to interaction zone Mc, the amplitude of the wave propagation A(S2,Mc) from source S2 to interaction zone Mc and the amplitude of the beam propagation A(Mc, Ri) from interaction zone Mc to receiver Ri (e.g., R1, R2, etc.) can also be computed. The image value of the non-linear properties can be expressed by the following equation (11).

$$I(Mc) = \sum_{Ri} M(Ri, t = T(Ri, Mc) + T(Ri, S1)) * \frac{1}{A(S1, Mc)} * \frac{1}{A(S2, Mc)} * \frac{1}{A(Mc, Ri)} \quad (11)$$

In one embodiment, appropriate small "noise factors" may be introduced into equation (11) in calculating inverse factors, e.g. (1/A(S1,Mc)), to stabilize these inverse weighting factors in accordance with standard signal processing best practice. If there is a micro-seismic event at Mc, the summation of all the measurement responses Ri coming from the micro-seismic event at Mc will be in phase while the contribution of all other micro-seismic events at other locations will be out of phase. Therefore, I(Mc) computed from Equation (11) contains only information from the micro-seismic event at Mc.

Equation (11) shows how a 3D image can be constructed from emulated micro-seismic events generated by acoustic waves from a pair of acoustic sources S1 and S2. Multiple images I(Mc; S1,S2) can be constructed from many pairs of acoustic sources S1 and S2 at different locations. If the propagation velocity model is correct, these images will have to be the same. If they are not the same, there are errors in the propagation velocity model. This self-consistent condition can be used to determine the correct propagation velocity model as well as the local velocity ratio Vp/Vs at the mixing location Mc.

The multiple images I(Mc; S1,S2) for a plurality of locations of S1 10 and S2 12 can be constructed assuming an initial propagation velocity model and local velocity ratio Vp/Vs ratio at the mixing location Mc. Updates to propagation velocity model by velocity tomography method can be performed to minimize the differences in the obtained (3D) images I(Mc; S1,S2). In one embodiment, the updating process can be iterated until the differences in the obtained images I(Mc; S1,S2) are minimized. The multiple images I(Mc; S1,S2) can then be combined to create a final image of non-linear properties of the medium or the local velocity ratio Vp/Vs or both.

In some aspect of the present disclosure, the above described data acquisition, processing and imaging can be used to perform time-lapse surveys. Variations in non-linearity or the velocity ratio Vp/Vs caused by, for example, stress, formation fluid pressure or saturation changes can be visible in d, δ, t space and thus may be localized approximately with no need for complex processing to transform into mapped properties.

The methods and systems described herein can be applied to any medium that sustain acoustic wave propagation. For example, the methods and systems can be applied to seismology, borehole logging, medical ultra-sound imaging, non-destructive testing and material sciences such as, but not limited to, locating damage in diffusion bonded samples, locating damage in explosives, locating damage in bone, correlating crack density and nonlinearity in composites, locating nonlinear features inside the bulk of a solid, etc. The methods and systems can also be used for general nonlinear non-destructive evaluation (NDE) of a material.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 11:
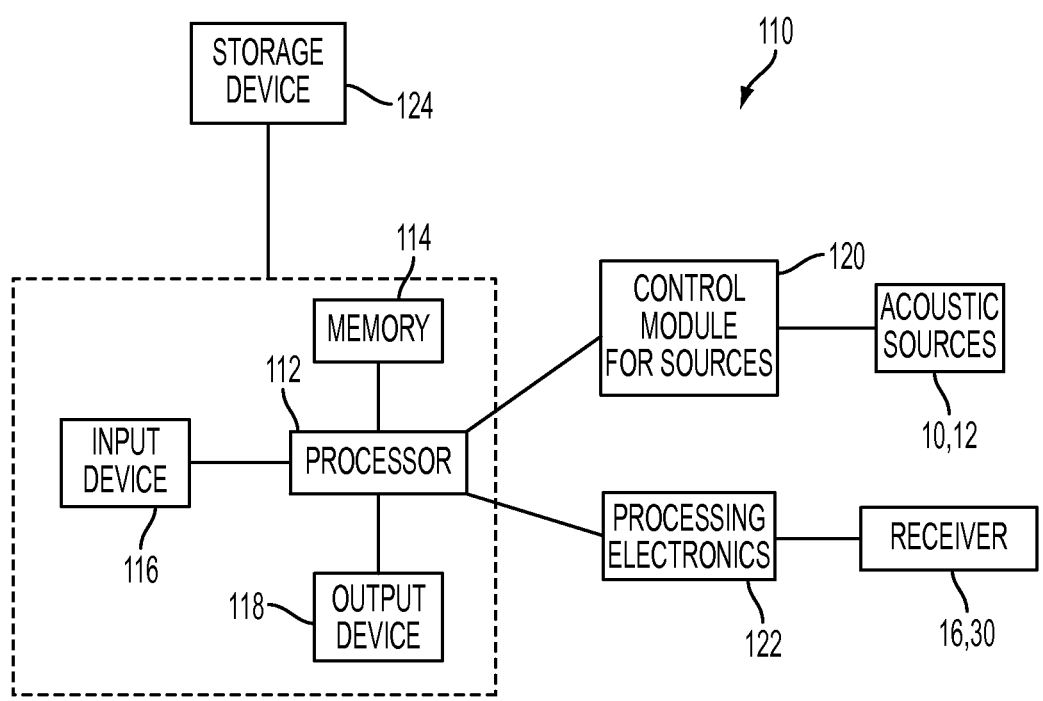
FIG. 11 is a computer system for implementing a seismic measurement method, according to an embodiment of the present invention.

FIG. 11 is a schematic diagram representing a computer system 110 for implementing the methods, according to an embodiment of the present invention. As shown in FIG. 15, computer system 110 comprises a processor (e.g., one or more processors) 112 and a memory 114 in communication with the processor 112. The computer system 110 may further include an input device 116 for inputting data (such as keyboard, a mouse or the like) and an output device 118 such as a display device for displaying results of the computation. The computer system 110 may be configured to control various modules including a control module 120 to control the acoustic sources 10 and 12, and control acquisition or processing electronics 122 for acquiring the measurement data obtained from receiver or receivers 16, 30. The measurement data can be stored in a storage device 124 for latter visualization or processing, etc. It must be appreciated that the term processor is used herein to encompass one or more processors. Where reference is made to a processor that term should be understood to encompass any of these computing arrangements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method of characterizing properties of a subsurface rock formation from a non-linear interaction, the method comprising:

generating, by a first acoustic source disposed on earth surface, a first acoustic wave;

generating, by a second acoustic source disposed on the earth surface spaced apart from the first acoustic source on a first line, a second acoustic wave, wherein the first acoustic source and the second acoustic source are controllable such that trajectories of the first and the second acoustic waves intersect in a mixing zone within the subsurface rock formation;

receiving, by a receiver positioned in a first plane generally perpendicular to the earth surface and containing the first line on which the first acoustic source and the second acoustic source are spaced apart, a third acoustic wave generated by a non-linear mixing process from the first acoustic wave and the second acoustic wave in the mixing zone; and creating a first two-dimensional image of non-linear properties or a first ratio of compressional velocity and shear velocity, or both, of the subsurface rock formation in the first plane generally perpendicular to the earth surface and containing the first line, based on the received third acoustic wave.

2. The method according to claim 1, further comprising moving the first acoustic source, the second acoustic source to a second line and creating a second two-dimensional image of the properties of the subsurface rock formation or a second ratio of compressional velocity and shear velocity of the subsurface rock formation, or both, in a second plane generally perpendicular to the earth surface and containing the second line, based on the received third acoustic wave.

3. The method according to claim 2, wherein moving the first acoustic source and the second acoustic source comprises moving the first acoustic source and the second acoustic source from the first line to the second line in a direction substantially perpendicular to the first line and the second line.

4. The method according to claim 2, further comprising moving the receiver with the first acoustic source and the second acoustic source from the first line to the second line.

5. The method according to claim 2, wherein moving the first acoustic source and the second acoustic source comprises rotating the first acoustic source and the second acoustic source from the first line to the second line around an axis passing through the receiver by a desired angular interval.

6. The method according to claim 2, further comprising combining the first two-dimensional image of the subsurface rock formation and the second two-dimensional image of the subsurface rock formation to create a three-dimensional image of the subsurface rock formation.

7. The method according to claim 1, further comprising disposing the receiver on the surface of the subsurface rock formation.

8. The method according to claim 1, further comprising disposing the receiver within a borehole inside the subsurface rock formation.

9. The method according to claim 1, wherein generating the first acoustic wave comprises generating a first coded acoustic wave comprising a first plurality of pulses arranged as a time sequence, the first plurality of pulses being separated in time, each pulse comprising a modulated signal at a central frequency, wherein central frequencies of two consecutive pulses are different.

10. The method according to claim 9, wherein generating the second acoustic wave comprises generating a second coded acoustic wave comprising a second plurality of pulses arranged as a time sequence, the second plurality of pulses being separated in time, wherein a separation in time between centers of two consecutive pulses is the same as a separation in time between centers of two corresponding pulses in the first plurality of pulses, wherein a start time difference is provided between a start time of a broadcast of the second plurality of pulses and a start time of a broadcast of the first plurality of pulses, wherein each pulse comprises a modulated signal and a central frequency of the modulated signal within each pulse in the second plurality of pulses is a selected fraction d of the central frequency of the modulated signal for the corresponding pulse in the first plurality of pulses.

11. The method according to claim 9, further comprising performing, by a processor, data processing on the received acoustic wave, or correlating with a coded signal template, or both, to extract a third signal generated by the non-linear mixing process over noise or over signals generated by a linear interaction process, or both, to obtain an emulated micro-seismic event signal occurring at the mixing zone of the first and second acoustic waves.

12. The method according to claim 11, wherein generating the first coded acoustic wave comprises generating the first acoustic wave such that a separation in time between the centers of two consecutive pulses in the first plurality of pulses is greater than a time duration of each pulse.

13. The method according to claim 11, wherein the third signal generated by the non-linear mixing process and received at the receiver comprises a third plurality of pulses arriving in a time sequence and separated in time, wherein a separation in time between centers of two consecutive pulses is the same as the separation in time between centers of two consecutive pulses in the first plurality of pulses,
wherein each pulse in the third plurality of pulses comprises a modulated signal having a central frequency of each pulse that is equal to a difference between the central frequency of the corresponding pulse of the first plurality of pulses and the central frequency of the corresponding pulse of the second plurality of pulses,
wherein an arrival time at the receiver of each pulse of the third plurality of pulses is time delayed relative to a generation of a corresponding pulse of the first plurality of pulses by a total of a travel time from the first acoustic source to a center of the mixing zone and a travel time from the center of the mixing zone to the receiver.

14. The method according to claim 11, further comprising repeating the generating of the first coded acoustic signal, the generating of the second coded acoustic signal, the receiving of the third signal and the performing of data processing or correlating with a coded signal template, or both, for a range of start time differences and a range of frequency fractions d to obtain signals from emulated micro-seismic events generated at a plurality of mixing zones.

15. The method according to claim 11, wherein generating the first acoustic wave comprises generating a first coded acoustic signal that is a sum of a plurality of pulses, wherein each pulse has a signal amplitude equal to the product of an envelope function and a modulated signal function, and wherein generating the second acoustic wave comprises generating a second coded acoustic signal that is a sum of a plurality of pulses, wherein each pulse has a signal amplitude equal to the product of an envelope function and a modulated signal function.

16. The method according to claim 11, wherein the correlating comprises correlating the detected signal with the coded template signal, wherein the template signal comprises a plurality of pulses, wherein the time separation between the center of the plurality of pulses in the template signal are the same as the time separation of the center of the plurality of pulses of the first acoustic signal and wherein the central frequency of the plurality of pulses in the third signal is a function of the central frequency of the plurality of pulses in first acoustic signal and the frequency fraction d.

17. The method according to claim 16, further comprising increasing a number of the first plurality of pulses and increasing a number of the second plurality of pulses to enhance discrimination of the third signal generated by the non-linear mixing process over noise or over signals generated by a linear interaction process, or both.

18. The method according to claim 17, further comprising:
extracting, by the processor, the third signal from the emulated micro-seismic event at the mixing zone by correlating the third acoustic wave at a receiver Ri with a coded template signal $u_s(t)$, and
repeating for a plurality of start time differences δ between the second plurality of pulses and the first plurality of pulses and for a plurality of frequency ratios d between the central frequency of the modulated signal within each pulse in the second plurality of pulses and the central frequency of the modulated signal with each corresponding pulse in the first plurality of pulses, the correlating between the template signal and the detected signal to yield, for each start time difference δ and for each frequency ratio d, a correlated signal for each receiver Ri denoted as M(Ri, t), which contains emulated micro-seismic events generated by non-linear interaction at specific mixing locations according to selection rules of non-linear interaction.

19. The method according to claim 18, further comprising calculating, for each start time difference δ and for each frequency ratio d and the corresponding correlated signal M(Ri, t), the spatial coordinates of emulated micro-seismic events where the two acoustic signals interact non-linearly using locus analysis and travel time calculations based on a velocity model for compression or shear wave velocity.

20. The method according to claim 19, further comprising applying time reversal operations to propagate backward in time the signals of the emulated micro-seismic events to the time and location of origination of the micro-seismic events with a propagation velocity model.

21. The method according to claim 18, further comprising generating a two-dimensional or three-dimensional image of the micro-seismic events or the non-linear properties of the subsurface rock formation, or both, by using Kirchhoff imaging, beam imaging, wave equation imaging, or time reversal method from the correlated signals containing emulated micro-seismic events at the mixing zones of the first and second acoustic signals, wherein the correlated signals are obtained from signals received at a plurality of receivers, wherein the first source and the second source are located at different locations.

22. The method according to claim 18, further comprising repeating the generating of the acoustic wave signal by the first source a plurality of time by disposing the first source at a plurality of locations and repeating the generating of the second acoustic wave by the second source a plurality of time by disposing the second source at a plurality of locations; and repeating the receiving of the third signal a plurality of time by disposing the receiver at a plurality of locations; and generating multiple three dimensional images of the non-linear properties of the subsurface rock formation by using Kirchhoff imaging, beam imaging, wave equation imaging, or time reversal method from the correlated signals containing emulated micro-seismic events at the mixing zones of the first and second acoustic signals, wherein the correlated signals are obtained from signals received at a plurality of receivers.

23. A system of characterizing properties of a subsurface rock formation from a non-linear interaction, the system comprising:
a first acoustic source disposed on earth surface, the first acoustic source being configured to generate a first acoustic wave;
a second acoustic source disposed on the earth surface spaced apart from the first acoustic source on a first line, the second acoustic source being configured to generate a second acoustic wave, wherein the first acoustic source and the second acoustic source are controllable such that trajectories of the first and the second acoustic waves intersect in a mixing zone within the subsurface rock formation;
a receiver positioned in a first plane generally perpendicular to the earth surface and containing the first line on which the first acoustic source and the second acoustic source are spaced apart, the receiver being configured to receive a third acoustic wave generated by a non-linear mixing process from the first acoustic wave and the second acoustic wave in the mixing zone; and
a processor configured to create a first two-dimensional image of non-linear properties or a first ratio of compressional velocity and shear velocity, or both, of the subsurface rock formation in the first plane generally perpendicular to the surface and containing the first line, based on the received third acoustic wave.

24. The system according to claim 23, wherein the first acoustic source and the second acoustic source are moveable to a second line and wherein the processor is further configured to create a second two-dimensional image of the properties of the subsurface rock formation or a second ratio of a compression velocity and shear velocity of the subsurface rock formation, or both, in a second plane generally perpendicular to the surface and containing the second line, based on the received third acoustic wave.

25. The system according to claim 24, wherein the first acoustic source and the second acoustic source are moveable from the first line to the second line in a direction substantially perpendicular to the first line and the second line.

26. The system according to claim 24, wherein the receiver is moveable with the first acoustic source and the second acoustic source from the first line to the second line.

27. The system according to claim 24, wherein the first acoustic source and the second acoustic source are moveable from the first line to the second line by rotating the first and the second acoustic sources around an axis passing through the receiver by a desired angular interval.

28. The system according to claim 24, wherein the processor is configured to combine the first two-dimensional image of the subsurface rock formation and the second two-dimensional image of the subsurface rock formation to create a three-dimensional image of the subsurface rock formation.

29. The system according to claim 23, wherein the receiver is disposed on the earth surface.

30. The system according to claim 23, wherein the receiver is disposed within a borehole inside the subsurface rock formation.

31. The system according to claim 23, wherein the first acoustic source is configured to generate a first coded acoustic signal comprising a first plurality of pulses arranged as a time sequence, the first plurality of pulses being separated in time, each pulse comprising a modulated signal at a central frequency, wherein central frequencies of two consecutive pulses are different.

32. The system according to claim 31, wherein the second acoustic source is configured to generate a second coded acoustic signal comprising a second plurality of pulses arranged as a time sequence, the second plurality of pulses being separated in time, wherein a separation in time between centers of two consecutive pulses is the same as a separation in time between centers of two corresponding pulses in the first plurality of pulses, wherein a start time difference is provided between a start time of a broadcast of the second plurality of pulses and a start time of a broadcast of the first plurality of pulses, wherein each pulse comprises a modulated signal and a central frequency of the modulated signal within each pulse in the second plurality of pulses is a selected fraction d of the central frequency of the modulated signal for the corresponding pulse in the first plurality of pulses.

33. The system according to claim 31, wherein the processor is configured to perform data processing on the received acoustic wave, or correlate with a coded signal template, or both, to extract a third signal generated by the non-linear mixing process over noise or over signals generated by a linear interaction process, or both, to obtain an emulated micro-seismic event signal occurring at the mixing zone of the first and second acoustic signals.

34. The system according to claim 33, wherein the first acoustic signal is generated such that a separation in time between the centers of two consecutive pulses in the first plurality of pulses is greater than a time duration of each pulse.

35. The system according to claim 33, wherein the third signal generated by the non-linear mixing process and received at the receiver comprises a third plurality of pulses arriving in a time sequence and separated in time, wherein a separation in time between centers of two consecutive pulses is the same as the separation in time between centers of two consecutive pulses in the first plurality of pulses,
wherein each pulse in the third plurality of pulses comprises a modulated signal having a central frequency of each pulse that is equal to a difference between the central frequency of the corresponding pulse of the first plurality of pulses and the central frequency of the corresponding pulse of the second plurality of pulses,
wherein an arrival time at the receiver of each pulse of the third plurality of pulses is time delayed relative to a generation of a corresponding pulse of the first plurality of pulses by a total of a travel time from the first acoustic source to a center of the mixing zone and a travel time from the center of the mixing zone to the receiver.

36. The system according to claim 33, wherein the first acoustic source and the second acoustic source are configured to repeat the generating of the first coded acoustic signal and the generating of the second coded acoustic signal, and the receiver is configured to repeat the receiving of the third signal, and the processor is configured to repeat the performing of data processing or correlating with a coded signal template, or both, for a range of start time differences and a range of frequency fractions d to obtain signals from emulated micro-seismic events generated at a plurality of mixing zones.

37. The system according to claim 33, wherein the first acoustic source is configured to generate a first coded acoustic signal that is a sum of a plurality of pulses, wherein each pulse has a signal amplitude equal to the product of an envelope function and a modulated signal function, and wherein the second acoustic source is configured to generate a second coded acoustic signal that is a sum of a plurality of pulses, wherein each pulse has a signal amplitude equal to the product of an envelope function and a modulated signal function.

38. The system according to claim 33, wherein the processor is configured to correlate the detected signal with the coded template signal, wherein the template signal comprises a plurality of pulses, wherein the time separation between the center of the plurality of pulses in the template signal are the same as the time separation of the center of the plurality of pulses of the first acoustic signal and wherein the central frequency of the plurality of pulses in the third signal is a function of the central frequency of the plurality of pulses in first acoustic signal and the frequency fraction d.

39. The system according to claim 38, wherein the first acoustic source is configured to increase a number of the first plurality of pulses and the second acoustic source is configured to increase a number of the second plurality of pulses to enhance discrimination of the third signal generated by the non-linear mixing process over noise or over signals generated by a linear interaction process, or both.

40. The system according to claim 39, wherein the processor is configured to extract the third signal from the emulated micro-seismic event at the mixing zone by correlating the third acoustic wave at a receiver Ri with a coded template signal $u_s(t)$, and repeat for a plurality of start time differences $\delta$ between the second plurality of pulses and the first plurality of pulses and for a plurality of frequency ratios d between the central frequency of the modulated signal within each pulse in the second plurality of pulses and the central frequency of the modulated signal with each corresponding pulse in the first plurality of pulses, the correlating between the template signal and the detected signal to yield, for each start time difference $\delta$ and for each frequency ratio d, a correlated signal for each receiver Ri denoted as M(Ri, t), which contains emulated micro-seismic events generated by non-linear interaction at specific mixing locations according to selection rules of non-linear interaction.

41. The system according to claim 40, wherein the processor is configured to calculate for each start time difference $\delta$ and for each frequency ratio d and the corresponding correlated signal M(Ri, t), the spatial coordinates of emulated micro-seismic events where the two acoustic signals interact non-linearly using locus analysis and travel time calculations based on a velocity model for compression or shear wave velocity.

42. The system according to claim 41, wherein the processor is configured to apply time reversal operations to propagate backward in time the signals of the emulated micro-seismic events to the time and location of origination of the micro-seismic events with a propagation velocity model.

43. The system according to claim 40, wherein the processor is configured to generate a two-dimensional or three-dimensional image of the micro-seismic events or the non-linear properties of the subsurface rock formation, or both, by using Kirchhoff imaging, beam imaging, wave equation imaging, or time reversal method from the correlated signals containing emulated micro-seismic events at the mixing zones of the first and second acoustic signals, wherein the correlated signals are obtained from signals received at a plurality of receivers, wherein the first source and the second source are located at different locations.

44. The system according to claim 40, wherein the first acoustic source is configured to repeat generating the first acoustic wave a plurality of times at a plurality of locations and wherein the second acoustic source is configured to repeat generating of the second acoustic wave a plurality of time at a plurality of locations; and
wherein the receiver is configured to repeat receiving the third signal a plurality of times at a plurality of locations; and
wherein the processor is configured to generate multiple three dimensional images of the non-linear properties of the subsurface rock formation by using Kirchhoff imaging, beam imaging, wave equation imaging, or time reversal method from the correlated signals containing emulated micro-seismic events at the mixing zones of the first and second acoustic signals, wherein the correlated signals are obtained from signals received at a plurality of receivers.

* * * * *